United States Patent
Kodeboyina et al.

(10) Patent No.: US 12,407,564 B2
(45) Date of Patent: Sep. 2, 2025

(54) IDENTIFYING AND MARKING FAILED EGRESS LINKS IN DATA PLANE

(71) Applicant: Barefoot Networks, Inc., Santa Clara, CA (US)

(72) Inventors: Chaitanya Kodeboyina, Los Altos, CA (US); John Cruz, Cupertino, CA (US); Steven Licking, San Jose, CA (US); Michael E. Attig, Sunnyvale, CA (US)

(73) Assignee: Barefoot Networks, Inc., Santa Clara, CA (US)

( * ) Notice: Subject to any disclaimer, the term of this patent is extended or adjusted under 35 U.S.C. 154(b) by 0 days.

(21) Appl. No.: 18/495,590

(22) Filed: Oct. 26, 2023

(65) Prior Publication Data

US 2024/0056348 A1     Feb. 15, 2024

Related U.S. Application Data

(63) Continuation of application No. 17/723,243, filed on Apr. 18, 2022, now abandoned, which is a
(Continued)

(51) Int. Cl.
*H04L 41/0677* (2022.01)
*H04L 41/0654* (2022.01)
(Continued)

(52) U.S. Cl.
CPC ...... *H04L 41/0677* (2013.01); *H04L 41/0654* (2013.01); *H04L 45/28* (2013.01);
(Continued)

(58) Field of Classification Search
CPC . H04L 41/0677; H04L 41/0654; H04L 45/28; H04L 45/42; H04L 45/64;
(Continued)

(56) References Cited

U.S. PATENT DOCUMENTS

| 1,522,006 A | 1/1925 | Fletcher |
| 4,490,785 A | 12/1984 | Strecker et al. |

(Continued)

FOREIGN PATENT DOCUMENTS

| CN | 1522006 | 8/2004 |
| CN | 1589551 | 3/2005 |

(Continued)

OTHER PUBLICATIONS

Notice of Allowance for U.S. Appl. No. 15/835,247, dated Jul. 29, 2022.
(Continued)

*Primary Examiner* — Harry H Kim
(74) *Attorney, Agent, or Firm* — Essential Patents Group, LLP; Christopher K. Gagne

(57) ABSTRACT

A method of identifying a failed egress path of a hardware forwarding element. The method detects an egress link failure in a data plane of the forwarding element. The method generates a link failure signal in the data plane identifying the failed egress link. The method generates a packet that includes the identification of the egress link based on the link failure signal. The method sets the status of the egress link to failed in the data plane based on the identification of the egress link in the generated packet.

36 Claims, 17 Drawing Sheets

Related U.S. Application Data continuation of application No. 16/903,305, filed on Jun. 16, 2020, now Pat. No. 11,310,099, which is a continuation of application No. 16/048,202, filed on Jul. 27, 2018, now abandoned, which is a continuation of application No. 15/150,015, filed on May 9, 2016, now Pat. No. 10,063,407.

(60) Provisional application No. 62/292,498, filed on Feb. 8, 2016.

(51) Int. Cl.
*H04L 45/28* (2022.01)
*H04L 45/42* (2022.01)
*H04L 45/64* (2022.01)
*H04L 45/745* (2022.01)
*H04L 49/00* (2022.01)
*H04L 49/55* (2022.01)
*H04L 69/22* (2022.01)

(52) U.S. Cl.
CPC .............. *H04L 45/42* (2013.01); *H04L 45/64* (2013.01); *H04L 45/745* (2013.01); *H04L 49/3063* (2013.01); *H04L 49/555* (2013.01); *H04L 69/22* (2013.01)

(58) Field of Classification Search
CPC . H04L 45/745; H04L 49/3063; H04L 49/555; H04L 69/22; Y02D 30/50
See application file for complete search history.

(56) References Cited

U.S. PATENT DOCUMENTS

| | | |
|---|---|---|
| 5,068,892 A | 11/1991 | Livanos |
| 5,243,596 A | 9/1993 | Port et al. |
| 5,642,483 A | 6/1997 | Topper |
| 5,757,795 A | 5/1998 | Schnell |
| 5,784,003 A | 7/1998 | Dahlgren |
| 5,987,521 A | 11/1999 | Arrowood et al. |
| 6,157,955 A | 12/2000 | Narad et al. |
| 6,442,172 B1 | 8/2002 | Wallner et al. |
| 6,453,360 B1 | 9/2002 | Muller et al. |
| 6,735,679 B1 | 5/2004 | Herbst et al. |
| 6,836,483 B1 | 12/2004 | Lee |
| 6,948,099 B1 | 9/2005 | Tallam |
| 6,976,149 B1 | 12/2005 | Brandt et al. |
| 6,980,552 B1 | 12/2005 | Belz et al. |
| 7,042,888 B2 | 5/2006 | Berggreen |
| 7,046,685 B1 | 5/2006 | Matsuoka et al. |
| 7,062,571 B1 | 6/2006 | Dale et al. |
| 7,110,404 B1 | 9/2006 | Temoshenko |
| 7,120,834 B1 | 10/2006 | Bishara |
| 7,177,276 B1 | 2/2007 | Epps et al. |
| 7,190,696 B1 | 3/2007 | Manur et al. |
| 7,203,740 B1 | 4/2007 | Putzolu et al. |
| 7,389,462 B1 | 6/2008 | Wang et al. |
| 7,421,688 B1 | 9/2008 | Righi et al. |
| 7,492,714 B1 | 2/2009 | Liao et al. |
| 7,499,941 B2 | 3/2009 | Michaeli et al. |
| 7,539,777 B1 | 5/2009 | Aitken |
| 7,633,880 B2 | 12/2009 | Bang et al. |
| 7,643,486 B2 | 1/2010 | Belz et al. |
| 7,664,873 B1 | 2/2010 | Ghosh et al. |
| 7,826,470 B1 | 11/2010 | Aloni et al. |
| 7,872,774 B2 | 1/2011 | Okamoto |
| 7,873,959 B2 | 1/2011 | Zhu et al. |
| 7,889,750 B1 | 2/2011 | Parker |
| 7,904,642 B1 | 3/2011 | Gupta et al. |
| 7,953,089 B1 | 5/2011 | Ramakrishnan et al. |
| 7,961,734 B2 | 6/2011 | Panwar et al. |
| 8,077,611 B2 | 12/2011 | Bettink et al. |
| 8,094,659 B1 | 1/2012 | Arad |
| 8,125,810 B2 | 2/2012 | Bosshart |
| 8,155,135 B2 | 4/2012 | Aloni et al. |
| 8,514,855 B1 | 8/2013 | Robertson et al. |
| 8,527,613 B2 | 9/2013 | Malone et al. |
| 8,553,582 B1 * | 10/2013 | Mizrahi ................. H04L 47/24 370/254 |
| 8,593,955 B2 | 11/2013 | Yano et al. |
| 8,638,793 B1 | 1/2014 | Ben-Mayor et al. |
| 8,693,374 B1 | 4/2014 | Murphy et al. |
| 8,738,860 B1 | 5/2014 | Griffin et al. |
| 8,788,512 B2 | 7/2014 | Asaad et al. |
| 8,798,047 B1 | 8/2014 | Wadekar et al. |
| 8,971,338 B2 | 3/2015 | Mishra et al. |
| 9,049,153 B2 | 6/2015 | Casado et al. |
| 9,049,271 B1 | 6/2015 | Hobbs et al. |
| 9,055,004 B2 | 6/2015 | Edsall et al. |
| 9,055,114 B1 | 6/2015 | Talaski et al. |
| 9,112,818 B1 | 8/2015 | Arad et al. |
| 9,124,644 B2 | 9/2015 | Patel et al. |
| 9,213,537 B2 | 12/2015 | Bandakka et al. |
| 9,258,224 B2 | 2/2016 | Bosshart et al. |
| 9,276,846 B2 | 3/2016 | Goyal et al. |
| 9,276,851 B1 | 3/2016 | Dror et al. |
| 9,294,386 B2 | 3/2016 | Narad |
| 9,298,446 B2 | 3/2016 | Chang et al. |
| 9,319,347 B1 | 4/2016 | Sindhu et al. |
| 9,438,505 B1 | 9/2016 | Zhou et al. |
| 9,450,817 B1 | 9/2016 | Bahadur et al. |
| 9,467,363 B2 | 10/2016 | Gao |
| 9,544,231 B2 | 1/2017 | Bosshart et al. |
| 9,559,985 B1 | 1/2017 | Ye et al. |
| 9,565,114 B1 | 2/2017 | Kabbani et al. |
| 9,571,400 B1 | 2/2017 | Mandal et al. |
| 9,590,925 B2 | 3/2017 | Yamashita |
| 9,608,913 B1 | 3/2017 | Kabbani et al. |
| 9,660,904 B2 | 5/2017 | Kotalwar et al. |
| 9,680,749 B2 | 6/2017 | Labonte et al. |
| 9,686,209 B1 | 6/2017 | Arad et al. |
| 9,692,690 B2 | 6/2017 | Joshi et al. |
| 9,712,439 B2 | 7/2017 | Bosshart et al. |
| 9,755,932 B1 | 9/2017 | Godbole et al. |
| 9,825,862 B2 | 11/2017 | Bosshart |
| 9,826,071 B2 | 11/2017 | Bosshart |
| 9,838,268 B1 | 12/2017 | Mattson |
| 9,860,081 B2 | 1/2018 | Keesara et al. |
| 9,876,719 B2 | 1/2018 | Revah et al. |
| 9,888,033 B1 | 2/2018 | Li et al. |
| 9,891,898 B1 | 2/2018 | Tonsing |
| 9,912,610 B2 | 3/2018 | Bosshart et al. |
| 9,912,774 B2 | 3/2018 | Daly et al. |
| 9,923,816 B2 | 3/2018 | Kim et al. |
| 9,960,956 B1 | 5/2018 | Johnson et al. |
| 10,009,276 B2 | 6/2018 | Bosshart et al. |
| 10,015,048 B2 | 7/2018 | Gasparakis et al. |
| 10,044,646 B1 | 8/2018 | Detwiler |
| 10,063,407 B1 | 8/2018 | Kodeboyina et al. |
| 10,091,090 B2 | 10/2018 | Chang |
| 10,091,137 B2 | 10/2018 | Tran et al. |
| 10,135,734 B1 | 11/2018 | Singh et al. |
| 10,225,381 B1 | 3/2019 | Bosshart |
| 10,237,206 B1 | 3/2019 | Agrawal et al. |
| 10,291,555 B2 | 5/2019 | K et al. |
| 10,313,231 B1 | 6/2019 | Bosshart |
| 10,341,242 B2 | 7/2019 | Srinivasan et al. |
| 10,361,914 B2 | 7/2019 | Gasparakis et al. |
| 10,404,619 B1 | 9/2019 | Agrawal et al. |
| 10,412,018 B1 | 9/2019 | Feng et al. |
| 10,419,242 B1 | 9/2019 | Tonsing et al. |
| 10,419,366 B1 | 9/2019 | Kim et al. |
| 10,432,527 B1 | 10/2019 | Bosshart |
| 10,686,735 B1 | 6/2020 | Watson |
| 10,694,006 B1 | 6/2020 | Watson et al. |
| 10,728,173 B1 | 7/2020 | Agrawal et al. |
| 10,757,028 B1 | 8/2020 | Watson et al. |
| 10,892,939 B2 | 1/2021 | Castaldelli et al. |
| 10,944,696 B2 | 3/2021 | Galles |
| 11,018,977 B2 | 5/2021 | Hood |
| 11,271,869 B1 | 3/2022 | Agrawal et al. |
| 11,388,053 B2 | 7/2022 | Gasparakis et al. |
| 11,394,610 B2 | 7/2022 | Gasparakis |

(56) References Cited

U.S. PATENT DOCUMENTS

| | | |
|---|---|---|
| 11,394,611 B2 | 7/2022 | Gasparakis et al. |
| 11,863,467 B2 | 1/2024 | Galles et al. |
| 2001/0042130 A1 | 11/2001 | Brown |
| 2001/0043611 A1 | 11/2001 | Kadambi et al. |
| 2002/0001356 A1 | 1/2002 | Shenoi |
| 2002/0136163 A1 | 9/2002 | Kawakami et al. |
| 2002/0141403 A1 | 10/2002 | Akahane et al. |
| 2002/0159466 A1 | 10/2002 | Rhoades |
| 2002/0172210 A1 | 11/2002 | Wolrich et al. |
| 2003/0005103 A1 | 1/2003 | Narad et al. |
| 2003/0009466 A1 | 1/2003 | Ta et al. |
| 2003/0043825 A1 | 3/2003 | Magnussen et al. |
| 2003/0046414 A1 | 3/2003 | Pettyjohn et al. |
| 2003/0046429 A1 | 3/2003 | Sonksen |
| 2003/0063345 A1 | 4/2003 | Fossum et al. |
| 2003/0107996 A1 | 6/2003 | Black et al. |
| 2003/0118022 A1 | 6/2003 | Kulkarni et al. |
| 2003/0147401 A1 | 8/2003 | Kyronaho et al. |
| 2003/0154358 A1 | 8/2003 | Seong et al. |
| 2003/0167373 A1 | 9/2003 | Winters et al. |
| 2003/0204631 A1 | 10/2003 | Pinkerton et al. |
| 2003/0219026 A1 | 11/2003 | Sun et al. |
| 2004/0024894 A1 | 2/2004 | Osman et al. |
| 2004/0031029 A1 | 2/2004 | Lee et al. |
| 2004/0042477 A1 | 3/2004 | Bitar et al. |
| 2004/0091104 A1 | 5/2004 | Kawamura et al. |
| 2004/0105384 A1 | 6/2004 | Gallezot et al. |
| 2004/0123220 A1 | 6/2004 | Johnson et al. |
| 2004/0165588 A1 | 8/2004 | Pandya |
| 2004/0213156 A1 | 10/2004 | Smallwood et al. |
| 2004/0235480 A1 | 11/2004 | Rezaaifar et al. |
| 2005/0013251 A1 | 1/2005 | Wang et al. |
| 2005/0041590 A1 | 2/2005 | Olakangil et al. |
| 2005/0060428 A1 | 3/2005 | Corl et al. |
| 2005/0078601 A1 | 4/2005 | Moll et al. |
| 2005/0078651 A1 | 4/2005 | Lee et al. |
| 2005/0086353 A1 | 4/2005 | Shirakawa et al. |
| 2005/0108518 A1 | 5/2005 | Pandya |
| 2005/0120173 A1 | 6/2005 | Minowa |
| 2005/0129059 A1 | 6/2005 | Jiang et al. |
| 2005/0135399 A1 | 6/2005 | Baden et al. |
| 2005/0147095 A1 | 7/2005 | Guerrero et al. |
| 2005/0149823 A1 | 7/2005 | Lee |
| 2005/0198531 A1 | 9/2005 | Kaniz et al. |
| 2005/0243852 A1 | 11/2005 | Bitar et al. |
| 2006/0002386 A1 | 1/2006 | Yik et al. |
| 2006/0039372 A1 | 2/2006 | Sarkinen et al. |
| 2006/0039374 A1 | 2/2006 | Belz et al. |
| 2006/0045088 A1 | 3/2006 | Nguyen |
| 2006/0050690 A1 | 3/2006 | Epps et al. |
| 2006/0072480 A1 | 4/2006 | Deval et al. |
| 2006/0092857 A1 | 5/2006 | Ansari et al. |
| 2006/0114895 A1 | 6/2006 | Anand et al. |
| 2006/0114914 A1 | 6/2006 | Anand et al. |
| 2006/0117126 A1 | 6/2006 | Leung et al. |
| 2006/0174242 A1 | 8/2006 | Zhu et al. |
| 2006/0232447 A1 | 10/2006 | Walker et al. |
| 2006/0245361 A1 | 11/2006 | Cheethirala et al. |
| 2006/0277346 A1 | 12/2006 | Doak et al. |
| 2007/0008985 A1 | 1/2007 | Lakshmanamurthy et al. |
| 2007/0047453 A1 | 3/2007 | Bender et al. |
| 2007/0050426 A1 | 3/2007 | Dubal et al. |
| 2007/0053283 A1 | 3/2007 | Bidwell et al. |
| 2007/0055664 A1 | 3/2007 | Michaeli et al. |
| 2007/0086364 A1 | 4/2007 | Ellis et al. |
| 2007/0104102 A1 | 5/2007 | Opsasnick |
| 2007/0104211 A1 | 5/2007 | Opsasnick |
| 2007/0153796 A1 | 7/2007 | Kesavan et al. |
| 2007/0177594 A1 | 8/2007 | Kompella |
| 2007/0195761 A1 | 8/2007 | Tatar et al. |
| 2007/0195773 A1 | 8/2007 | Tatar et al. |
| 2007/0208876 A1 | 9/2007 | Davis |
| 2007/0223388 A1 | 9/2007 | Arad et al. |
| 2007/0230493 A1 | 10/2007 | Dravida et al. |
| 2007/0236734 A1 | 10/2007 | Okamoto |
| 2007/0250713 A1 | 10/2007 | Rahman et al. |
| 2007/0280277 A1 | 12/2007 | Lund et al. |
| 2008/0082792 A1 | 4/2008 | Vincent et al. |
| 2008/0114892 A1 | 5/2008 | Bruno et al. |
| 2008/0130670 A1 | 6/2008 | Kim et al. |
| 2008/0144662 A1 | 6/2008 | Marcondes et al. |
| 2008/0151890 A1 | 6/2008 | Zelig et al. |
| 2008/0175449 A1 | 7/2008 | Fang et al. |
| 2008/0285571 A1 | 11/2008 | Arulambalam et al. |
| 2009/0006605 A1 | 1/2009 | Chen et al. |
| 2009/0096797 A1 | 4/2009 | Du et al. |
| 2009/0106523 A1 | 4/2009 | Steiss |
| 2009/0147787 A1 | 6/2009 | Arulambalam et al. |
| 2009/0180475 A1 | 7/2009 | Hashimoto |
| 2009/0307241 A1 | 12/2009 | Schimunek et al. |
| 2010/0020680 A1 | 1/2010 | Salam et al. |
| 2010/0085891 A1 | 4/2010 | Kind et al. |
| 2010/0128735 A1 | 5/2010 | Lipschutz |
| 2010/0135158 A1 | 6/2010 | Adams |
| 2010/0140364 A1 | 6/2010 | Nordberg et al. |
| 2010/0145475 A1 | 6/2010 | Bartels et al. |
| 2010/0150164 A1 | 6/2010 | Ma |
| 2010/0182920 A1 | 7/2010 | Matsuoka |
| 2010/0191951 A1 | 7/2010 | Malone et al. |
| 2010/0228733 A1 | 9/2010 | Harrison et al. |
| 2010/0238812 A1 | 9/2010 | Boutros et al. |
| 2010/0312941 A1 | 12/2010 | Aloni et al. |
| 2011/0080916 A1 | 4/2011 | Davies et al. |
| 2011/0149776 A1 | 6/2011 | Park et al. |
| 2011/0149960 A1 | 6/2011 | Gutierrez |
| 2012/0020206 A1 | 1/2012 | Busi et al. |
| 2012/0033550 A1 | 2/2012 | Yano et al. |
| 2012/0155395 A1 | 6/2012 | Yadav et al. |
| 2012/0159235 A1 | 6/2012 | Suganthi et al. |
| 2012/0170585 A1 | 7/2012 | Mehra et al. |
| 2012/0173661 A1 | 7/2012 | Mahaffey et al. |
| 2012/0177047 A1 | 7/2012 | Roitshtein |
| 2012/0284438 A1 | 11/2012 | Zievers |
| 2012/0294152 A1* | 11/2012 | Yousefi'zadeh ...... H04W 40/12 370/238 |
| 2013/0003556 A1 | 1/2013 | Boden et al. |
| 2013/0028072 A1 | 1/2013 | Addanki |
| 2013/0028265 A1 | 1/2013 | Ronchetti et al. |
| 2013/0083660 A1 | 4/2013 | Rajagopalan et al. |
| 2013/0100951 A1 | 4/2013 | Ishizuka |
| 2013/0108264 A1 | 5/2013 | Deruijter et al. |
| 2013/0124491 A1 | 5/2013 | Pepper et al. |
| 2013/0163426 A1* | 6/2013 | Beliveau ................. H04L 67/63 370/235 |
| 2013/0163427 A1 | 6/2013 | Beliveau et al. |
| 2013/0163475 A1 | 6/2013 | Beliveau et al. |
| 2013/0166703 A1 | 6/2013 | Hammer et al. |
| 2013/0177016 A1 | 7/2013 | Nakano et al. |
| 2013/0227051 A1 | 8/2013 | Khakpour et al. |
| 2013/0227519 A1 | 8/2013 | Maleport |
| 2013/0279504 A1 | 10/2013 | Gulati et al. |
| 2013/0290622 A1 | 10/2013 | Dey et al. |
| 2013/0315054 A1 | 11/2013 | Shamis et al. |
| 2013/0318107 A1 | 11/2013 | Asaad et al. |
| 2013/0322231 A1 | 12/2013 | Császár et al. |
| 2013/0322232 A1 | 12/2013 | Császár et al. |
| 2013/0322457 A1 | 12/2013 | Budhia et al. |
| 2013/0346814 A1 | 12/2013 | Zadigian et al. |
| 2014/0033489 A1 | 2/2014 | Kawashima |
| 2014/0040477 A1 | 2/2014 | King et al. |
| 2014/0040527 A1 | 2/2014 | Kanigicheria et al. |
| 2014/0043974 A1 | 2/2014 | Kwan et al. |
| 2014/0050002 A1 | 2/2014 | Sun |
| 2014/0082302 A1 | 3/2014 | Rommelmann et al. |
| 2014/0115571 A1 | 4/2014 | Wang et al. |
| 2014/0115666 A1 | 4/2014 | Morchon et al. |
| 2014/0140342 A1 | 5/2014 | Narad |
| 2014/0181232 A1 | 6/2014 | Manula et al. |
| 2014/0181818 A1 | 6/2014 | Vincent et al. |
| 2014/0204943 A1 | 7/2014 | Palmer |
| 2014/0233568 A1 | 8/2014 | Dong |
| 2014/0241358 A1 | 8/2014 | Bosshart et al. |
| 2014/0241359 A1 | 8/2014 | Bosshart et al. |
| 2014/0241361 A1 | 8/2014 | Bosshart et al. |

(56) References Cited

U.S. PATENT DOCUMENTS

| | | |
|---|---|---|
| 2014/0241362 A1 | 8/2014 | Bosshart et al. |
| 2014/0244966 A1 | 8/2014 | Bosshart et al. |
| 2014/0269432 A1 | 9/2014 | Goyal et al. |
| 2014/0301192 A1 | 10/2014 | Lee et al. |
| 2014/0321473 A1 | 10/2014 | Chen et al. |
| 2014/0321476 A1 | 10/2014 | Yu et al. |
| 2014/0328180 A1 | 11/2014 | Kim et al. |
| 2014/0328344 A1 | 11/2014 | Bosshart |
| 2014/0334489 A1 | 11/2014 | Bosshart et al. |
| 2015/0003259 A1 | 1/2015 | Gao |
| 2015/0009796 A1 | 1/2015 | Koponen et al. |
| 2015/0010000 A1 | 1/2015 | Zhang et al. |
| 2015/0020060 A1 | 1/2015 | Bandakka et al. |
| 2015/0023147 A1 | 1/2015 | Lee et al. |
| 2015/0043589 A1 | 2/2015 | Han et al. |
| 2015/0055652 A1 | 2/2015 | Yong et al. |
| 2015/0081833 A1 | 3/2015 | Pettit et al. |
| 2015/0092539 A1 | 4/2015 | Sivabalan et al. |
| 2015/0109913 A1 | 4/2015 | Yamashita |
| 2015/0110114 A1 | 4/2015 | Wohlgemuth et al. |
| 2015/0121355 A1 | 4/2015 | Chang et al. |
| 2015/0127701 A1 | 5/2015 | Chu et al. |
| 2015/0131666 A1 | 5/2015 | Kang et al. |
| 2015/0131667 A1 | 5/2015 | Ko et al. |
| 2015/0142932 A1 | 5/2015 | Hallivuori et al. |
| 2015/0142991 A1 | 5/2015 | Zaloom |
| 2015/0146527 A1 | 5/2015 | Kishore et al. |
| 2015/0156288 A1 | 6/2015 | Lu et al. |
| 2015/0172198 A1 | 6/2015 | Levy et al. |
| 2015/0178395 A1 | 6/2015 | Tiwari et al. |
| 2015/0180769 A1 | 6/2015 | Wang et al. |
| 2015/0194215 A1 | 7/2015 | Douglas et al. |
| 2015/0195206 A1 | 7/2015 | Memon et al. |
| 2015/0222560 A1 | 8/2015 | Kakadia et al. |
| 2015/0249572 A1 | 9/2015 | Mack-Crane et al. |
| 2015/0256465 A1 | 9/2015 | Mack-Crane et al. |
| 2015/0271011 A1 | 9/2015 | Neginhal et al. |
| 2015/0281125 A1 | 10/2015 | Koponen et al. |
| 2015/0295818 A1 | 10/2015 | Hayashitani et al. |
| 2015/0295862 A1 | 10/2015 | Banerjee et al. |
| 2015/0312135 A1 | 10/2015 | Velayudhan et al. |
| 2015/0319086 A1 | 11/2015 | Tripathi et al. |
| 2015/0358290 A1 | 12/2015 | Jain et al. |
| 2015/0363522 A1 | 12/2015 | Maurya |
| 2015/0381418 A1 | 12/2015 | Fausak et al. |
| 2015/0381495 A1 | 12/2015 | Cherian et al. |
| 2016/0006654 A1 | 1/2016 | Fernando et al. |
| 2016/0014028 A1 | 1/2016 | He et al. |
| 2016/0014073 A1 | 1/2016 | Reddy et al. |
| 2016/0019161 A1 | 1/2016 | Patel et al. |
| 2016/0063189 A1 | 3/2016 | Soon-Shiong et al. |
| 2016/0094460 A1 | 3/2016 | Shelar et al. |
| 2016/0105471 A1 | 4/2016 | Nunes et al. |
| 2016/0112317 A1 | 4/2016 | Hood |
| 2016/0139892 A1 | 5/2016 | Atreya et al. |
| 2016/0142220 A1 | 5/2016 | Hao et al. |
| 2016/0142315 A1 | 5/2016 | Tomonaga et al. |
| 2016/0149784 A1 | 5/2016 | Zhang et al. |
| 2016/0154756 A1 | 6/2016 | Dodson et al. |
| 2016/0156557 A1 | 6/2016 | Bosshart et al. |
| 2016/0173371 A1 | 6/2016 | Bays |
| 2016/0173383 A1 | 6/2016 | Liu et al. |
| 2016/0188313 A1 | 6/2016 | Dubal et al. |
| 2016/0188320 A1 | 6/2016 | Chang et al. |
| 2016/0191306 A1 | 6/2016 | Gasparakis et al. |
| 2016/0191361 A1 | 6/2016 | Behera et al. |
| 2016/0191370 A1 | 6/2016 | Wood |
| 2016/0191384 A1 | 6/2016 | Shelar et al. |
| 2016/0191406 A1 | 6/2016 | Xiao et al. |
| 2016/0191530 A1 | 6/2016 | Jain et al. |
| 2016/0197852 A1 | 7/2016 | Hutchison et al. |
| 2016/0212012 A1 | 7/2016 | Young et al. |
| 2016/0232019 A1 | 8/2016 | Shah et al. |
| 2016/0234067 A1 | 8/2016 | Dolganow et al. |
| 2016/0234097 A1 | 8/2016 | Chang |
| 2016/0234102 A1 | 8/2016 | Kotalwar et al. |
| 2016/0234103 A1 | 8/2016 | Kotalwar et al. |
| 2016/0234112 A1 | 8/2016 | Anand |
| 2016/0241459 A1 | 8/2016 | Zheng et al. |
| 2016/0301601 A1 | 10/2016 | Anand et al. |
| 2016/0315866 A1 | 10/2016 | Thapar et al. |
| 2016/0323243 A1 | 11/2016 | Levasseur et al. |
| 2016/0330127 A1 | 11/2016 | Kim et al. |
| 2016/0330128 A1 | 11/2016 | Wang |
| 2016/0337329 A1 | 11/2016 | Sood et al. |
| 2016/0342510 A1 | 11/2016 | Pani |
| 2016/0344629 A1 | 11/2016 | Gray |
| 2016/0357534 A1 | 12/2016 | Krishnamoorthi et al. |
| 2016/0359685 A1 | 12/2016 | Yadav et al. |
| 2017/0005951 A1 | 1/2017 | Labonte et al. |
| 2017/0013452 A1 | 1/2017 | Mentze et al. |
| 2017/0019302 A1 | 1/2017 | Lapiotis et al. |
| 2017/0019329 A1 | 1/2017 | Kozat et al. |
| 2017/0034082 A1 | 2/2017 | Pfaff |
| 2017/0041209 A1 | 2/2017 | Joshi et al. |
| 2017/0048144 A1 | 2/2017 | Liu |
| 2017/0053012 A1 | 2/2017 | Levy et al. |
| 2017/0063690 A1 | 3/2017 | Bosshart |
| 2017/0064047 A1 | 3/2017 | Bosshart |
| 2017/0070416 A1 | 3/2017 | Narayanan et al. |
| 2017/0075692 A1 | 3/2017 | Naresh et al. |
| 2017/0085414 A1 | 3/2017 | Castaldelli et al. |
| 2017/0085477 A1 | 3/2017 | Li et al. |
| 2017/0085479 A1 | 3/2017 | Wang et al. |
| 2017/0091258 A1 | 3/2017 | Rajahalme |
| 2017/0093707 A1 | 3/2017 | Kim et al. |
| 2017/0093986 A1 | 3/2017 | Kim et al. |
| 2017/0093987 A1 | 3/2017 | Kaushalram et al. |
| 2017/0111275 A1 | 4/2017 | Li et al. |
| 2017/0118041 A1 | 4/2017 | Bhattacharya et al. |
| 2017/0118042 A1 | 4/2017 | Bhattacharya et al. |
| 2017/0126588 A1 | 5/2017 | Anand et al. |
| 2017/0134282 A1 | 5/2017 | Agarwal et al. |
| 2017/0134310 A1 | 5/2017 | Koladi et al. |
| 2017/0142000 A1 | 5/2017 | Cai et al. |
| 2017/0142011 A1 | 5/2017 | Zhang et al. |
| 2017/0149632 A1 | 5/2017 | Saltsidis et al. |
| 2017/0180273 A1 | 6/2017 | Daly et al. |
| 2017/0195229 A1 | 7/2017 | Ulas et al. |
| 2017/0208015 A1 | 7/2017 | Volkening et al. |
| 2017/0220499 A1 | 8/2017 | Gray |
| 2017/0222881 A1 | 8/2017 | Holbrook et al. |
| 2017/0223575 A1 | 8/2017 | Duda et al. |
| 2017/0251077 A1 | 8/2017 | Eerpini et al. |
| 2017/0257684 A1 | 9/2017 | Anand et al. |
| 2017/0264571 A1 | 9/2017 | Aibester et al. |
| 2017/0289034 A1 | 10/2017 | Bosshart et al. |
| 2017/0295500 A1 | 10/2017 | Sun et al. |
| 2017/0302504 A1 | 10/2017 | Wang et al. |
| 2018/0006945 A1 | 1/2018 | Flajslik et al. |
| 2018/0006950 A1 | 1/2018 | Flajslik et al. |
| 2018/0054385 A1 | 2/2018 | Dharmapurikar et al. |
| 2018/0103060 A1 | 4/2018 | Li et al. |
| 2018/0115478 A1 | 4/2018 | Kim et al. |
| 2018/0124183 A1 | 5/2018 | Kozat et al. |
| 2018/0191640 A1 | 7/2018 | Calderon et al. |
| 2018/0234340 A1 | 8/2018 | Kim et al. |
| 2018/0234355 A1 | 8/2018 | Kim et al. |
| 2018/0262424 A1 | 9/2018 | Roeland et al. |
| 2018/0287819 A1 | 10/2018 | Mayer-Wolf et al. |
| 2018/0316549 A1 | 11/2018 | Gasparakis et al. |
| 2018/0375755 A1 | 12/2018 | Joshi et al. |
| 2019/0394086 A1 | 12/2019 | Gasparakis et al. |
| 2020/0007473 A1 | 1/2020 | Kim et al. |
| 2020/0021486 A1 | 1/2020 | Gasparakis et al. |
| 2020/0076737 A1 | 3/2020 | Bosshart |
| 2020/0084093 A1 | 3/2020 | Gasparakis et al. |
| 2020/0099617 A1 | 3/2020 | Bosshart |
| 2020/0099618 A1 | 3/2020 | Bosshart |
| 2020/0099619 A1 | 3/2020 | Bosshart |
| 2020/0228433 A1 | 7/2020 | Lee |
| 2020/0244576 A1 | 7/2020 | Wetterwald et al. |
| 2020/0267098 A1 | 8/2020 | Galles |
| 2020/0280428 A1 | 9/2020 | Kovacs et al. |

(56) References Cited

U.S. PATENT DOCUMENTS

| | | |
|---|---|---|
| 2020/0280518 A1 | 9/2020 | Lee et al. |
| 2020/0314219 A1 | 10/2020 | Watson et al. |
| 2021/0194800 A1 | 6/2021 | Bosshart |
| 2022/0029935 A1 | 1/2022 | Bosshart et al. |
| 2022/0060555 A1 | 2/2022 | Daly et al. |
| 2022/0091992 A1 | 3/2022 | Shanbhogue et al. |
| 2022/0321404 A1 | 10/2022 | Gasparakis et al. |
| 2022/0345423 A1 | 10/2022 | Watson et al. |
| 2023/0231818 A1 | 7/2023 | Galles et al. |
| 2024/0080276 A1 | 3/2024 | Agrawal et al. |

FOREIGN PATENT DOCUMENTS

| | | | |
|---|---|---|---|
| CN | 101305561 | A | 11/2008 |
| CN | 101352012 | | 1/2009 |
| CN | 101453673 | A | 6/2009 |
| CN | 103248573 | | 8/2013 |
| CN | 104067231 | | 9/2014 |
| CN | 104205080 | | 12/2014 |
| CN | 104205753 | A | 12/2014 |
| CN | 105052113 | | 11/2015 |
| EP | 3229424 | | 10/2017 |
| JP | 2015080175 | A | 4/2015 |
| JP | 6127900 | B2 | 5/2017 |
| WO | 2013101024 | | 7/2013 |
| WO | 2016063189 | | 4/2016 |
| WO | 2017112165 | | 6/2017 |

OTHER PUBLICATIONS

Notice of Allowance for U.S. Appl. No. 15/835,249, dated Jul. 25, 2019.
Notice of Allowance for U.S. Appl. No. 15/835,250, dated Jul. 25, 2019, 17 pages.
Notice of Allowance for U.S. Appl. No. 15/878,966, dated May 15, 2019.
Notice of Allowance for U.S. Appl. No. 16/026,318, dated Mar. 12, 2019.
Notice of Allowance for U.S. Appl. No. 16/271,624, dated Mar. 17, 2020.
Notice of Allowance for U.S. Appl. No. 16/460,798, dated May 27, 2021.
Notice of Allowance for U.S. Appl. No. 16/519,873, dated Aug. 30, 2021.
Notice of Allowance for U.S. Appl. No. 16/519,873, dated Dec. 3, 2021.
Notice of Allowance for U.S. Appl. No. 16/519,873, dated Mar. 17, 2022.
Notice of Allowance for U.S. Appl. No. 16/573,847, dated Apr. 14, 2022.
Notice of Allowance for U.S. Appl. No. 16/573,847, dated Dec. 15, 2021.
Notice of Allowance for U.S. Appl. No. 16/582,798 (U.S. Appl. No. 16/582,798), dated Aug. 27, 2021.
Notice of Allowance for U.S. Appl. No. 16/582,798, dated Dec. 1, 2021.
Notice of Allowance for U.S. Appl. No. 16/582,798, dated Mar. 22, 2022.
Notice of Allowance for U.S. Appl. No. 16/687,271, dated Aug. 30, 2021.
Notice of Allowance for U.S. Appl. No. 16/687,271, dated Dec. 1, 2021.
Notice of Allowance for U.S. Appl. No. 16/687,271, dated Mar. 22, 2022.
Notice of Allowance for U.S. Appl. No. 16/695,044 dated Apr. 27, 2022.
Notice of Allowance for U.S. Appl. No. 16/695,049, dated Apr. 28, 2022.
Notice of Allowance for U.S. Appl. No. 16/695,049, dated Jan. 5, 2022.
Notice of Allowance for U.S. Appl. No. 16/789,339, dated Jul. 29, 2021.
Notice of Allowance for U.S. Appl. No. 16/879,704, dated Apr. 26, 2022.
Notice of Allowance for U.S. Appl. No. 16/903,305 notified Dec. 9, 2021, 13 pgs.
Notice of Allowance for U.S. Appl. No. 17/318,890, dated Jun. 8, 2022.
Notice of Allowance for U.S. Appl. No. 17/318,890, dated Mar. 3, 2022.
Notice of Allowance for U.S. Appl. No. 17/484,004, dated Feb. 15, 2023.
Notice of Allowance for U.S. Appl. No. 17/494,515, dated Feb. 28, 2023.
Notice of Allowance for U.S. Appl. No. 17/867,508, dated Nov. 14, 2022.
Notice of Allowance from Chinese Patent Application No. 202111206815.1 notified Mar. 19, 2024, 6 pgs.
Notice of Allowance from Chinese Patent Application No. 202111494631.X notified Jan. 2, 2024, 4 pgs.
Notice of Allowance from U.S. Appl. No. 17/134,110 notified Apr. 26, 2023, 9 pgs.
Notice of Allowance from U.S. Appl. No. 17/837,864 notified Jul. 14, 2023, 14 pgs.
Notice of Allowance from U.S. Appl. No. 17/837,864 notified Jun. 20, 2024, 18 pgs.
Notice of Allowance from U.S. Appl. No. 17/837,864 notified Mar. 1, 2024, 18 pgs.
Notice of Allowance from U.S. Appl. No. 17/837,864 notified Oct. 31, 2023, 17 pgs.
Notice of Allowance from U.S. Appl. No. 17/859,722 notified Aug. 9, 2023, 9 pgs.
Notice of Allowance from U.S. Appl. No. 18/077,543 notified Apr. 8, 2024, 13 pgs.
Notice of Allowance from U.S. Appl. No. 18/077,543 notified Aug. 23, 2023, 16 pgs.
Notice of Allowance from U.S. Appl. No. 18/077,543 notified Jul. 24, 2024, 13 pgs.
Notice of Allowance from U.S. Appl. No. 18/077,543 notified Nov. 19, 2024, 14 pgs.
Notice of Allowance from U.S. Appl. No. 18/130,733 notified May 16, 2024, 13 pgs.
Notice of Allowance from U.S. Appl. No. 18/130,733 notified Feb. 7, 2024, 14 pgs.
Notice of Allowance from U.S. Appl. No. 18/212,546 notified Jun. 12, 2024, 40 pgs.
Notice of Allowance from U.S. Appl. No. 18/212,546 notified Mar. 7, 2025, 9 pgs.
Notice of Allowance from U.S. Appl. No. 18/212,546 notified Sep. 11, 2024, 16 pgs.
Notice of Allowance from U.S. Appl. No. 17/859,722 notified Dec. 12, 2023, 16 pgs.
Notice of Allowance from U.S. Appl. No. 18/077,543 notified Dec. 15, 2023, 17 pgs.
Notice of Allowance from U.S. Appl. No. 18/214,665 notified May 8, 2024, 43 pgs.
Office Action for Chinese Patent Application No. 201680075637.4, dated Mar. 2, 2021.
Office Action for Chinese Patent Application No. 201680075637.4, dated Sep. 23, 2021.
Office Action for U.S. Appl. No. 15/878,966, dated Jan. 11, 2019.
Office Action for U.S. Appl. No. 14/583,664, dated Feb. 27, 2017.
Office Action for U.S. Appl. No. 14/583,664, dated Jul. 28, 2016.
Office Action for U.S. Appl. No. 14/583,664, dated Oct. 18, 2017.
Office Action for U.S. Appl. No. 14/863,961, dated Jun. 16, 2017.
Office Action for U.S. Appl. No. 14/864,032, dated Feb. 14, 2017.
Office Action for U.S. Appl. No. 14/977,810, dated Jun. 29, 2017.
Office Action for U.S. Appl. No. 15/094,987, dated Sep. 21, 2017.
Office Action for U.S. Appl. No. 15/150,015, dated Dec. 29, 2017.
Office Action for U.S. Appl. No. 15/449,974, dated Jun. 1, 2018.
Office Action for U.S. Appl. No. 15/678,549, dated Feb. 26, 2019.
Office Action for U.S. Appl. No. 15/678,549, dated Jul. 30, 2019.
Office Action for U.S. Appl. No. 15/678,556, dated Jun. 19, 2019.

(56) References Cited

OTHER PUBLICATIONS

Office Action for U.S. Appl. No. 15/678,565, dated Jun. 13, 2019.
Office Action for U.S. Appl. No. 15/729,593, dated Aug. 10, 2018.
Office Action for U.S. Appl. No. 15/784,191, dated Aug. 26, 2020, 14 pages.
Office Action for U.S. Appl. No. 15/784,191, dated Dec. 19, 2018, 11 pages.
Office Action for U.S. Appl. No. 15/784,191, dated Jan. 24, 2020, 12 pages.
Office Action for U.S. Appl. No. 15/784,192, dated Sep. 19, 2019, 14 pages.
Office Action for U.S. Appl. No. 15/835,233, dated Feb. 8, 2019, 17 pages.
Office Action for U.S. Appl. No. 15/835,235, dated Feb. 25, 2019, 24 pages.
Office Action for U.S. Appl. No. 15/835,238, dated Dec. 11, 2019.
Office Action for U.S. Appl. No. 15/835,238, dated Feb. 7, 2019.
Office Action for U.S. Appl. No. 15/835,238, dated Jun. 19, 2019.
Office Action for U.S. Appl. No. 15/835,238, dated Jun. 5, 2020.
Office Action for U.S. Appl. No. 15/835,239, dated Feb. 7, 2019, 20 pages.
Office Action for U.S. Appl. No. 15/835,239, dated Jun. 19, 2019, 18 pages.
Office Action for U.S. Appl. No. 15/835,242, dated Oct. 18, 2019, 8 pages.
Office Action for U.S. Appl. No. 15/835,247, dated Dec. 31, 2018, 18 pages.
Office Action for U.S. Appl. No. 15/835,247, dated Jul. 10, 2019.
Office Action for U.S. Appl. No. 15/835,249, dated Dec. 31, 2018.
Office Action for U.S. Appl. No. 15/835,250, dated Apr. 4, 2019, 16 pages.
Office Action for U.S. Appl. No. 15/835,393, dated Jan. 7, 2021.
Office Action for U.S. Appl. No. 15/888,050, dated Jun. 11, 2019.
Office Action for U.S. Appl. No. 15/888,054, dated Mar. 11, 2019.
Office Action for U.S. Appl. No. 16/026,318, dated Sep. 20, 2018.
Office Action for U.S. Appl. No. 16/048,202, dated Sep. 26, 2019.
Office Action for U.S. Appl. No. 16/271,624, dated Oct. 31, 2019.
Office Action for U.S. Appl. No. 16/288,074, dated Oct. 7, 2020.
Office Action for U.S. Appl. No. 16/288,074, dated Mar. 5, 2020.
Office Action for U.S. Appl. No. 16/460,798, dated Nov. 18, 2020.
Office Action for U.S. Appl. No. 16/4670,798, dated Nov. 18, 2020.
Office Action for U.S. Appl. No. 16/519,873, dated Jun. 11, 2021.
Office Action for U.S. Appl. No. 16/548,833, mailed Dec. 9, 2020.
Office Action for U.S. Appl. No. 16/569,554, dated Aug. 18, 2020.
Non-Final Office Action from U.S. Appl. No. 18/201,060 notified Sep. 16, 2024, 50 pgs.
Non-Final Office Action from U.S. Appl. No. 18/214,665 notified Feb. 1, 2024, 9 pgs.
Non-Final Office Action from U.S. Appl. No. 18/734,862 notified Mar. 13, 2025, 45 pgs.
Non-Published commonly owned U.S. Appl. No. 15/678,549, filed Aug. 16, 2017, 41 pages, Barefoot Networks, Inc.
Non-Published Commonly Owned U.S. Appl. No. 15/784,191, filed Oct. 16, 2017, 36 pages, Barefoot Networks, Inc.
Non-Published commonly owned U.S. Appl. No. 16/288,074, filed Feb. 27, 2019, 47 pages, Barefoot Networks, Inc.
Non-Published Commonly Owned U.S. Appl. No. 15/784,192, filed Oct. 16, 2017, 36 pages, Barefoot Networks, Inc.
Non-Published commonly owned U.S. Appl. No. 15/678,556, filed Aug. 16, 2017, 42 pages, Barefoot Networks, Inc.
Non-Published commonly owned U.S. Appl. No. 15/678,565, filed Aug. 16, 2017, 42 pages.
Non-Published commonly owned U.S. Appl. No. 15/729,555, filed Oct. 10, 2017, 40 pages, Barefoot Networks, Inc.
Non-Published commonly owned U.S. Appl. No. 15/729,593, filed Oct. 10, 2017, 40 pages, Barefoot Networks, Inc.
Non-Published Commonly Owned U.S. Appl. No. 15/784,190, filed Oct. 16, 2017.
Non-Published commonly owned U.S. Appl. No. 15/835,233, dated Dec. 7, 2017, 36 pages, Barefoot Networks, Inc.
Non-Published commonly owned U.S. Appl. No. 15/835,235, dated Dec. 7, 2017, 36 pages, Barefoot Networks, Inc.
Non-Published commonly owned U.S. Appl. No. 15/835,238, filed Dec. 7, 2017, 69 pages, Barefoot Networks, Inc.
Non-Published commonly owned U.S. Appl. No. 15/835,239, filed Dec. 7, 2017, 69 pages, Barefoot Networks, Inc.
Non-Published commonly owned U.S. Appl. No. 15/835,242, filed Dec. 7, 2017, 69 pages, Barefoot Networks, Inc.
Non-Published commonly owned U.S. Appl. No. 15/835,247, filed Dec. 7, 2017, 68 pages, Barefoot Networks, Inc.
Non-Published commonly owned U.S. Appl. No. 15/835,249, filed Dec. 7, 2017, 69 pages, Barefoot Networks, Inc.
Non-Published commonly owned U.S. Appl. No. 15/835,250, filed Dec. 7, 2017, 68 pages, Barefoot Networks, Inc.
Notice of Allowance for Chinese Patent Application No. 201680075637.4, dated Apr. 1, 2022.
Notice of Allowance for U.S. Appl. No. 14/583,664, dated Feb. 28, 2018.
Notice of Allowance for U.S. Appl. No. 14/836,850, dated Jun. 20, 2017.
Notice of Allowance for U.S. Appl. No. 14/836,855, dated Jun. 30, 2017.
Notice of Allowance for U.S. Appl. No. 14/977,810, dated Oct. 20, 2017.
Notice of Allowance for U.S. Appl. No. 15/150,015 notified May 21, 2018, 8 pgs.
Notice of Allowance for U.S. Appl. No. 15/150,015 notified Aug. 21, 2018, 8 pgs.
Notice of Allowance for U.S. Appl. No. 15/678,549, dated Apr. 8, 2020.
Notice of Allowance for U.S. Appl. No. 15/678,549, dated Dec. 27, 2019.
Notice of Allowance for U.S. Appl. No. 15/678,556, dated Feb. 4, 2020.
Notice of Allowance for U.S. Appl. No. 15/729,555, dated May 2, 2019.
Notice of Allowance for U.S. Appl. No. 15/729,593, dated Nov. 15, 2018.
Notice of Allowance for U.S. Appl. No. 15/784,190, dated May 10, 2019, 20 pages.
Notice of Allowance for U.S. Appl. No. 15/784,191, dated Apr. 19, 2019, 7 pages.
Notice of Allowance for U.S. Appl. No. 15/784,191, dated Aug. 21, 2019, 8 pages.
Notice of Allowance for U.S. Appl. No. 15/784,191, dated Aug. 31, 2021.
Notice of Allowance for U.S. Appl. No. 15/784,191, dated May 5, 2021.
Notice of Allowance for U.S. Appl. No. 15/784,192, mailed Mar. 17, 2021.
Notice of Allowance for U.S. Appl. No. 15/784,192, dated Jun. 30, 2021.
Notice of Allowance for U.S. Appl. No. 15/784,192, dated Sep. 30, 2021.
Notice of Allowance for U.S. Appl. No. 15/835,233, dated Jul. 3, 2019, 8 pages.
Notice of Allowance for U.S. Appl. No. 15/835,233, dated Oct. 29, 2019.
Notice of Allowance for U.S. Appl. No. 15/835,235, dated Apr. 24, 2020.
Notice of Allowance for U.S. Appl. No. 15/835,235, dated Aug. 20, 2019, 16 pages.
Notice of Allowance for U.S. Appl. No. 15/835,238, dated Sep. 30, 2020.
Notice of Allowance for U.S. Appl. No. 15/835,239, dated Nov. 13, 2019, 10 pages.
Notice of Allowance for U.S. Appl. No. 15/835,242, dated Jun. 24, 2020.
Notice of Allowance for U.S. Appl. No. 15/835,242, dated Jul. 1, 2019, 7 pages.
Notice of Allowance for U.S. Appl. No. 15/835,247 dated Dec. 29, 2021.

(56) References Cited

OTHER PUBLICATIONS

Notice of Allowance for U.S. Appl. No. 15/835,247, dated Apr. 7, 2022.
"In-band Network Telemetry (INT)," The P4.org Applications Working Group, Contributions from: Alibaba, Arista, Barefoot Networks, Dell, Intel, VMware. Dec. 11, 2017, 29 pgs.
"Intel Tofino 6.4 Tbps, 4 pipelines," Intel, 3 pgs.
"L2 EtherChannel Load Balancing", Cisco Community, https://www.cisco.com/c/en/us/support/docs/lan-switching/etherchannel/12023-4.html, Jun. 30, 2015, 11 pages.
"P416 Language Specification Version 1.0.0," The P2 Language Consortium, Jul. 22, 2017, 129 pgs.
"P416 Language Specification Version 1.1.0," The P4 Language Consortium, Nov. 20, 2018, 147 pgs.
"The P4 Language Specification Version 1.0.2," The P4 Language Consortium, Mar. 3, 2015, 90 pgs.
"The P4 Language Specification Version 1.0.4," The P4 Language Consortium, May 24, 2017, 97 pgs.
"The P4 Language Specification Version 1.0.5," The P4 Language Consortium, Nov. 26, 2018, 96 pgs.
"The P4 Language Specification Version 1.1.0," The P4 Language Consortium, Jan. 27, 2016, 124 pgs.
"The P4 Language Specification, Version 1.0.3," The P4 Language Consortium, Nov. 2, 2016, 97 pgs.
"The Walls Come Down on the Last Bastion of Proprietary," The Next Platform, Jun. 14, 2016, 13 pgs.
"Tofino 2.0 Tbps, 2 pipelines," Intel, 3 pgs.
"Tofino 3.2 Tbps, 2 pipelines," Intel, 3 pgs.
"Tofino 3.2 Tbps, 4 pipelines," Intel, 3 pgs.
"Tofino(TM)-based Wedge 100B Switch Designs with the Open Compute Project (OCP)," Barefoot Networks, Jan. 23, 2017. 7 pgs.
Advisory Action for U.S. Appl. No. 15/094,987, dated Sep. 6, 2018, 4 pages.
Advisory Action for U.S. Appl. No. 15/835,238, dated Nov. 22, 2019, 3 pages.
Advisory Action for U.S. Appl. No. 15/888,054, dated Feb. 10, 2020.
Ahmadi, Mahmood et al., "Hashing Functions Performance in Packet Classification", Computer Engineering Laboratory, Delft University of Technology, Jan. 2007 6 pages.
Arashloo, Mina Tahmasbi, et al., SNAP: Stateful Network-Wide Abstractions for Packet Processing, SIGCOMM '16, Aug. 22-26, 2016, 27 pages, ACM, Florianopolis, Brazil.
Bosshart, et al., "P4: Programming Protocol-Independent Packet Processors," ACM SIGCOMM Computer Communication Review, vol. 44, No. 3. Jul. 2014, 8 pgs.
Bosshart, P., et al., Forwarding Metamorphosis: Fast Programmable Match-Action Processing in Hardware or SDN, SIGCOMM'13, Aug. 12-16, 2013, 12 pages, ACM, Hong Kong, China.
Eisenbud, D. et al., "Maglev: A Fast and Reliable Software Network Load Balancer", 13th USENIX Symposium on Networked Systems Design and Implementation, Mar. 16, 2016, 13 pages, USENIX Association, Santa Clara, CA USA.
Fan, B. et al., "Small Cache, Big Effect: Provable Load Balancing for Randomly Partitioned Cluster Services", SOCC'11, 2nd ACM Symposium on Cloud Computing, Oct. 27-28, 2011 12 pages, ACM, Cascais, Portugal.
Final Office Action for U.S. Appl. No. 15/094,987, dated Apr. 4, 2018, 13 pages.
Final Office Action for U.S. Appl. No. 15/784,191, dated Feb. 26, 2021.
Final Office Action for U.S. Appl. No. 15/784,191, dated May 7, 2020, 13 pages.
Final Office Action for U.S. Appl. No. 15/784,192, dated Jun. 1, 2020, 14 pages.
Final Office Action for U.S. Appl. No. 15/888,050, dated Dec. 12, 2019.
Final Office Action for U.S. Appl. No. 15/888,054, dated Sep. 18, 2019.
Final Office Action for U.S. Appl. No. 16/378,491, dated Sep. 17, 2020.
Final Office Action for U.S. Appl. No. 16/695,044, dated Dec. 20, 2021.
Final Office Action for U.S. Appl. No. 16/804,960, dated Apr. 14, 2022.
Final Office Action for U.S. Appl. No. 17/134,110 dated Oct. 25, 2022.
Final Office Action for U.S. Appl. No. 16/048,202, dated Apr. 30, 2020.
Final Office Action from U.S. Appl. No. 17/723,243 notified Apr. 10, 2024, 48 pgs.
Final Office Action from U.S. Appl. No. 17/860,879 notified Dec. 26, 2024, 68 pgs.
Final Office Action from U.S. Appl. No. 18/201,060 notified Jan. 17, 2025, 26 pgs.
Gurevich, "Programmable Data Plane at Terabit Speeds," Barefoot Networks, May 16, 2017, 45 pgs.
International Preliminary Report on Patentability for PCT Application No. PCT/US2016/062511, dated Jun. 26, 2018.
International Search Report and Written Opinion for PCT Application No. PCT/US2016/062511, dated Feb. 28, 2017.
Kaufmann, A., et al., High Performance Packet Processing with FlexNIC, ASPLOS'16, Apr. 2-6, 2016, 15 pages, ACM, Atlanta, GA, USA.
Kfoury, et al., "An Exhaustive Survey on P4 Programmable Data Plane Switches: Taxonomy, Applications, Challenges, and Future Trends," IEEE, vol. 14, 2016, 64 pgs.
Moshref, Masoud, et al., Flow-level State Transition as a New Switch Primitive for SON, HotSDN'14, Aug. 22, 2014, 6 pages, ACM, Chicago, IL, USA.
Non-Final Office Action for U.S. Appl. No. 16/569,554, dated Feb. 19, 2021.
Non-Final Office Action from U.S. Appl. No. 17/723,243 notified Sep. 15, 2023, 32 pgs.
Non-Final Office Action from U.S. Appl. No. 17/837,864 notified Mar. 16, 2023, 18 pgs.
Non-Final Office Action from U.S. Appl. No. 17/860,879 notified Sep. 6, 2024, 92 pgs.
Non-Final Office Action from U.S. Appl. No. 18/130,733 notified Oct. 26, 2023, 13 pgs.
Office Action for U.S. Appl. No. 16/569,554, dated Jul. 2, 2021.
Office Action for U.S. Appl. No. 16/569,554, dated Mar. 14, 2022.
Office Action for U.S. Appl. No. 16/569,554, dated Sep. 27, 2021.
Office Action for U.S. Appl. No. 16/573,847 dated Jan. 6, 2021.
Office Action for U.S. Appl. No. 16/573,847, dated Aug. 2, 2021.
Office Action for U.S. Appl. No. 16/582,798, dated Jun. 24, 2021.
Office Action for U.S. Appl. No. 16/687,271, dated Jun. 24, 2021.
Office Action for U.S. Appl. No. 16/695,044, dated Jul. 8, 2021.
Office Action for U.S. Appl. No. 16/695,049, dated Jul. 21, 2021.
Office Action for U.S. Appl. No. 16/695,053 dated Aug. 4, 2021.
Office Action for U.S. Appl. No. 16/695,053 dated Jan. 5, 2022.
Office Action for U.S. Appl. No. 16/695,053, dated May 11, 2022.
Office Action for U.S. Appl. No. 16/695,053, dated Oct. 14, 2022.
Office Action for U.S. Appl. No. 16/804,960, dated Aug. 19, 2021.
Office Action for U.S. Appl. No. 16/804,960, dated Dec. 13, 2021.
Office Action for U.S. Appl. No. 16/804,960, dated May 12, 2021.
Office Action for U.S. Appl. No. 16/903,305 notified Mar. 24, 2021, 17 pgs.
Office Action for U.S. Appl. No. 17/134,110, dated Dec. 22, 2022.
Office Action for U.S. Appl. No. 17/134,110, dated Jun. 24, 2022.
Office Action for U.S. Appl. No. 17/346,035, dated Aug. 23, 2022.
Office Action for U.S. Appl. No. 17/484,004, dated Oct. 27, 2022.
Office Action for U.S. Appl. No. 17/859,722, dated Mar. 28, 2023.
Office Action for U.S. Appl. No. 17/859,722, dated Oct. 26, 2022.
Office Action for U.S. Appl. No. 16/378,491, dated Feb. 21, 2020.
Office Action for U.S. Appl. No. 17/152,658 notified Oct. 14, 2022, 12 pgs.
Office Action from Chinese Patent Application No. 202111206815.1 notified Oct. 19, 2023, 14 pgs.
Office Action from Chinese Patent Application No. 202111494631.X notified Jul. 18, 2023, 18 pgs.

(56) References Cited

OTHER PUBLICATIONS

Office Action from Chinese Patent Application No. 202111494631.X notified Oct. 20, 2023, 5 pgs.

Office Action in Chinese Patent Application No. 201680075637.4, dated Jan. 5, 2022.

Selection of Cyclic Redundancy Code and Checksum Algorithms to Ensure Critical Data Integrity, Federal Aviation Administration William J. Hughes Technical Center Aviation Research Division Atlantic City International Airport New Jersey 08405, DOT/FAA/TC-14/49, Mar. 2015, 111 pages.

Shantharama, P., et al., Hardware-Accelerated Platforms and Infrastructures for Network Functions: A Survey of Enabling Technologies and Research Studies, IEEE Access, Jul. 29, 2020.

Sivaraman, A., et al., Towards Programmable Packet Scheduling, HotNets'15, Nov. 16-17, 2015, 7 pages, ACM, Philadelphia, PA, USA.

Sivaraman, Anirudh, et al., Packet Transactions: A Programming Model for Data-Plane Algorithms at Hardware Speed, arXiv:1512.05023v1, Dec. 16, 2015, 22 pages.

Sivaraman, Anirudh, et al., Packet Transactions: High-level Programming for Line-Rate Switches, ? rXiv:1512.05023v2, Jan. 30, 2016, 16 pages.

Sivaraman, Anirudh, et al., Packet Transactions: High-level Programming for Line-Rate Switches, SIGCOMM'16, Aug. 22-26, 2016, 14 pages, ACM, Florianopolis, Brazil.

Sivaraman, Anirudh, et al., Programmable Packet Scheduling at Line Rate, SIGCOMM'16, Aug. 22-26, 2016, 14 pages, ACM, Florianopolis, Brazil.

Song, Protocol-Oblivious Forwarding: Unleashe the Power of SDN through a Future-Proof Forwarding Plane, Huawei Technologies, USA, 6 pages.

Notice of Allowance from U.S. Appl. No. 17/860,879 notified Apr. 9, 2025, 20 pgs.

Notice of Allowance from U.S. Appl. No. 18/201,060 notified Apr. 2, 2025, 7 pgs.

\* cited by examiner

IDENTIFYING AND MARKING FAILED EGRESS LINKS IN DATA PLANE

CLAIM OF PRIORITY

This application is a continuation of prior co-pending U.S. patent application Ser. No. 17/723,243, filed Apr. 18, 2022 and titled "IDENTIFYING AND MARKING FAILED EGRESS LINKS IN DATA PLANE," which is a continuation of U.S. patent application Ser. No. 16/903,305, filed Jun. 16, 2020 and titled "IDENTIFYING AND MARKING FAILED EGRESS LINKS IN DATA PLANE,", now U.S. Pat. No. 11,310,099, which is a continuation of U.S. patent application Ser. No. 16/048,202, filed Jul. 27, 2018 and titled "IDENTIFYING AND MARKING FAILED EGRESS LINKS IN DATA PLANE,", which is a continuation of U.S. patent application Ser. No. 15/150,015, filed May 9, 2016 and titled "IDENTIFYING AND MARKING FAILED EGRESS LINKS IN DATA PLANE," now U.S. Pat. No. 10,063,407, which claims the benefit of prior U.S. Provisional Patent Application No. 62/292,498, filed Feb. 8, 2016 and titled "IDENTIFYING AND MARKING FAILED EGRESS LINKS IN DATA PLANE." Each of the aforesaid prior Patent Applications is hereby incorporated herein by reference in its entirety.

BACKGROUND

A forwarding element such as a switch or a router can often send packets to a destination through several different egress paths. The forwarding elements utilize different algorithms to identify the best path to send the packets to optimize network congestion as well as transmission time.

Once one of these egress paths fails, the forwarding element has to get notified that the path has failed and mark the path as failed in order to avoid forwarding packets on the failed path. A path may fail due to a port or a wire failure inside the forwarding element or due to a path failure several hops away between the forwarding element and a packet destination.

A typical solution to keep track of the failed paths is using software in the control plane of the forwarding element to keep track of the status of the configured paths and mark a path as failed as soon as the path becomes unavailable. Utilizing software to keep track of and update the list of failed paths is, however, slow. Depending on the load of the processor that is executing the software, marking a path as failed by software may take several milliseconds. Such a delay is not desirable and can cause significant delays in a high-speed forwarding element.

BRIEF SUMMARY

Some embodiments provide a hardware forwarding element (e.g., a hardware switch or a hardware router) with a novel packet-processing pipeline that quickly marks a failed egress path by performing a set of hardware and firmware operations in the data plane. The forwarding element in some embodiments includes an ingress pipeline, a traffic manager, and an egress pipeline. Each one of the ingress and egress pipelines includes a pipeline with a parser, a match-action unit (MAU), and a deparser.

The parser receives the packets coming into the pipeline and produces a packet header vector (PHV) as its output. The PHV provides the input data to the match tables of the MAU. The MAU includes a set of match-action stages. Each of these stages matches a particular set of header fields included in the PHV against a match table and takes an action based on the result of the match. The output PHV is then handed to the deparser, which reassembles the packet by putting back together the output PHV and the payload of the packet that the deparser receives directly from the parser.

The forwarding element also includes a packet generator that is capable of generating packets inside the forwarding element and placing them in the packet pipeline. The packet generator receives the identification of failed paths or ports. For instance, when a port or a wire inside the forwarding element fails, some embodiments generate an interrupt that provides the identification of the failed port (or path). The packet generator in some embodiments also utilizes mechanisms such as keep alive to determine failed paths that are several hops away. Once the packet generator receives the identification of a failed link (i.e., a failed port or a failed path), the packet generator generates a packet that includes the identification of the failed link in a predetermined location in the packet header. The packet goes through the MAU pipeline and matches a predefined match field. The action corresponding to the match field causes an action unit in the forwarding element to use the failed link identification and compute an index to the status bit of the failed link in a data structure and to set the status bit to off (i.e., to indicate that the link has failed).

Some embodiments utilize a process to mark an egress link (i.e., a path or a port) as failed by performing a set of operations that are done by dedicated hardware and firmware in the data plane of the forwarding element. The process receives an indication that an egress link (i.e., a path or a port) of the forwarding element has failed. The process then generates a packet inside the forwarding element and includes an identification of the failed link (i.e., the failed path or port) in a predetermined field of the packet header.

The process then places the packet in the packet pipeline of the forwarding element. The process then parses the packet and places the identification of the failed link in a register of the PHV and forwards the PHV to the MAU. The process matches the identification of the failed link in the PHV with the match field of a match-action entry that is preprogrammed to match the link's identification. Each match field has a corresponding action.

Once the identification of the failed link matches a match field, the process uses an arithmetic logic unit (ALU) to perform the corresponding action of the match-action entry. The process determines the location of the link's status bit in a data structure (e.g., a link status table or a port status table) that keeps track of live and failed links. The process sets the bit at the determined location to off (or failed). The data structure is stored in a dual port memory that is capable of being written directly by hardware. Once the status bit of the failed link is updated, the packet is no longer needed and is dropped.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Software defined networks (SDNs) decouple the data and control planes. The data plane, which is also referred to as forwarding plane or user plane, is the part of the network that carries data packets (i.e., user packets) traffic. In contrast, the control plane in a network controls signaling traffic and routing.

In a forwarding element (e.g., a hardware switch or a hardware router), the data plane is the part of the architecture that decides what to do with the packets that arrive at the ingress interface. The data plane of a forwarding element is implemented by hardware and firmware while the control plane is implemented in software to provide for a more flexible management of network components from a central location. Keeping track of failed paths by the software in the control plane could, however, be time consuming and slow.

Some embodiments provide a hardware forwarding element with a novel packet-processing pipeline that quickly marks a failed egress link by performing a set of hardware operations in the data plane. In the following discussions, the term link is used to refer to a path or a port. The hardware forwarding element of some embodiments includes, among other elements, an ingress pipeline and an egress pipeline. Each of these pipelines includes a parser, a match-action unit (MAU), and a deparser.

Figure 1:
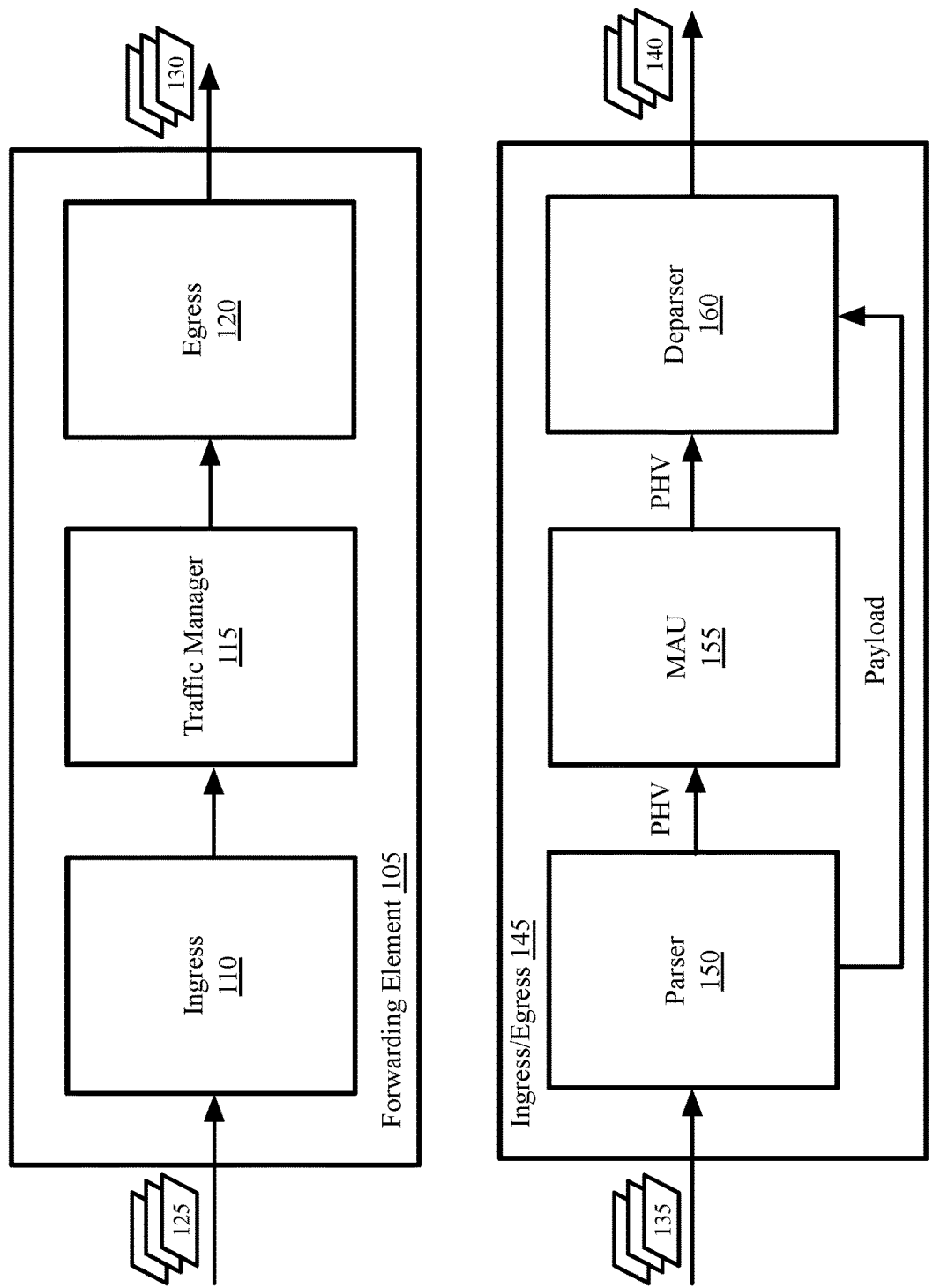
FIG. 1 conceptually illustrates a block diagram of a hardware forwarding element and a block diagram of an ingress/egress pipeline of the hardware forwarding element in some embodiments.

FIG. 1 conceptually illustrates a block diagram of a hardware forwarding element 105 and a block diagram of an ingress or egress pipeline 145 of the hardware forwarding element in some embodiments. As shown, the forwarding element 105 includes an ingress pipeline (or data path) 110, a traffic manager 115, and an egress pipeline 120.

The traffic manager 115 has several components such as a queuing and buffering system, a packet replicator, and a port failure feedback generator. These components are described further below. The ingress pipeline 110 receives packets 125 from a set of channels (e.g., through a set of I/O modules), parses each packet header into a packet header vector (PHV), sends the PHV through a set of match and action stages which may modify the PHV, deparses the packet headers back from the PHV into packet format, and queues the packet in a centralized data buffer (i.e., a data buffer provided by the traffic manager 115). Each one of these operations is described in more detail below by reference to the pipeline 145. The block diagram of both the ingress pipeline 110 and the egress pipeline 120 is similar to the pipeline 145.

In some embodiments, the traffic manager 115 receives the packets that are processed by the ingress pipeline and provides a large shared buffer (storage) that accommodates the queuing delays due to oversubscription of the output channels of the ingress deparser. In some embodiments, the data buffer stores packet data, while pointers to that data are kept in different queues per channel. Each channel in turn requests data from the common data buffer using a configurable queuing policy. When pointers to packets reach the head of the queues, the packets are read out of the data buffer of the traffic manager 115 into the egress pipeline 120.

The egress pipeline 120 receives the packets from the traffic manager 115. The parser in egress pipeline separates the packet payload from the packet headers, stores the packets headers in a PHV, sends the PHV through a set of match and action stages, deparses the packet headers back from the PHV into packet format, and sends the packets 130 to an appropriate output port of the forwarding element 105 to be driven off the forwarding element (e.g., through one of the output channels). An output packet may be the same packet as the corresponding input packet (i.e., with identical packet headers), or it may have different packet headers compared to the input packet based on the actions that are applied to the packet headers in the ingress and egress pipelines (e.g., different header field values for certain header fields and/or different sets of header fields).

It should be understood that the illustrated blocks in forwarding element 105 are exemplary only. The ingress, traffic manager, and egress blocks are simplified for ease of description. For example, although the figure shows only one entry point to the ingress parser and one exit point from the egress deparser, in some embodiments the input signals are received by many different input channels (e.g., 64 channels) and the output signals are sent out of the forwarding element from different output channels (e.g., 64 channels). Additionally, although for the illustrated forwarding element only one parser interface is shown for the ingress/egress pipeline 145, some embodiments employ numerous parser blocks (e.g., 16 parser blocks) that feed a match-action unit (MAU) in each pipeline.

FIG. 1 also shows a block diagram 145 of an interface of the hardware forwarding element 105. Each one of the ingress 110 and egress 120 pipelines use an interface similar to the interface 145. The interface includes a pipeline with three different units, namely a parser unit 150, an MAU 155, and a deparser unit 160. The parser 150 of some embodiments receives the incoming packets and produces a packet header vector (PHV) as its output. In other words, the parser 150 separates the packet headers from the packet payload by extracting different fields of packet headers and storing them in the PHV.

In some embodiments the PHV includes a set of different size registers or containers. For instance, in some embodiments the PHV includes sixty-four 8-bit registers, ninety-six 16-bit registers, and sixty-four 32-bit registers (for a total of 224 registers containing 4096 bits). Other embodiments may have any different numbers of registers of different sizes. In some embodiments, the parser 150 stores each extracted packet header in a particular subset of one or more registers of the PHV. For example, the parser might store a first header field in one 16-bit register and a second header field in a combination of an 8-bit register and a 32-bit register (e.g., if the header field is 36 bits long).

The PHV provides the input data to the match tables of the MAU. In some embodiments the MAU 155 includes a set of match-action stages (e.g., 32 match-action stages). Each of these stages matches a particular set of header fields against a match table and takes an action based on the result of the match (e.g., assigning the packet to an output port and queue, dropping the packet, modifying one or more of the header fields, etc.). Based on the actions taken on different header data during the different stages of the MAU 155, the PHV that the MAU outputs might include the same header data as the PHV that the MAU received from the parser, or the output PHV might contain different data than the input PHV.

The output PHV is then handed to the deparser 160. The deparser 160 reassembles the packet by putting back together the output PHV (that might or might not have been modified) that the deparser receives from the MAU 155 and the payload of the packet that the deparser receives directly from the parser 150. The deparser then sends the packets 140 out of the ingress/egress pipeline (to the traffic manager 115 or out of the forwarding element, depending on whether it is the deparser for the ingress pipeline or the egress pipeline).

I. Identifying and Marking Failed Links in Data Plane

Forwarding a packet from a forwarding element to a destination that is several hops away can often be done over several different paths. Once a path is determined to have failed, an alternative path with the same cost (or a path with the least possible cost) is selected to replace the failed path. One such example is equal-cost multi-path (ECMP) routing. Another example is link aggregation (LAG).

A. Forwarding the Packets using ECMP

Figure 2:
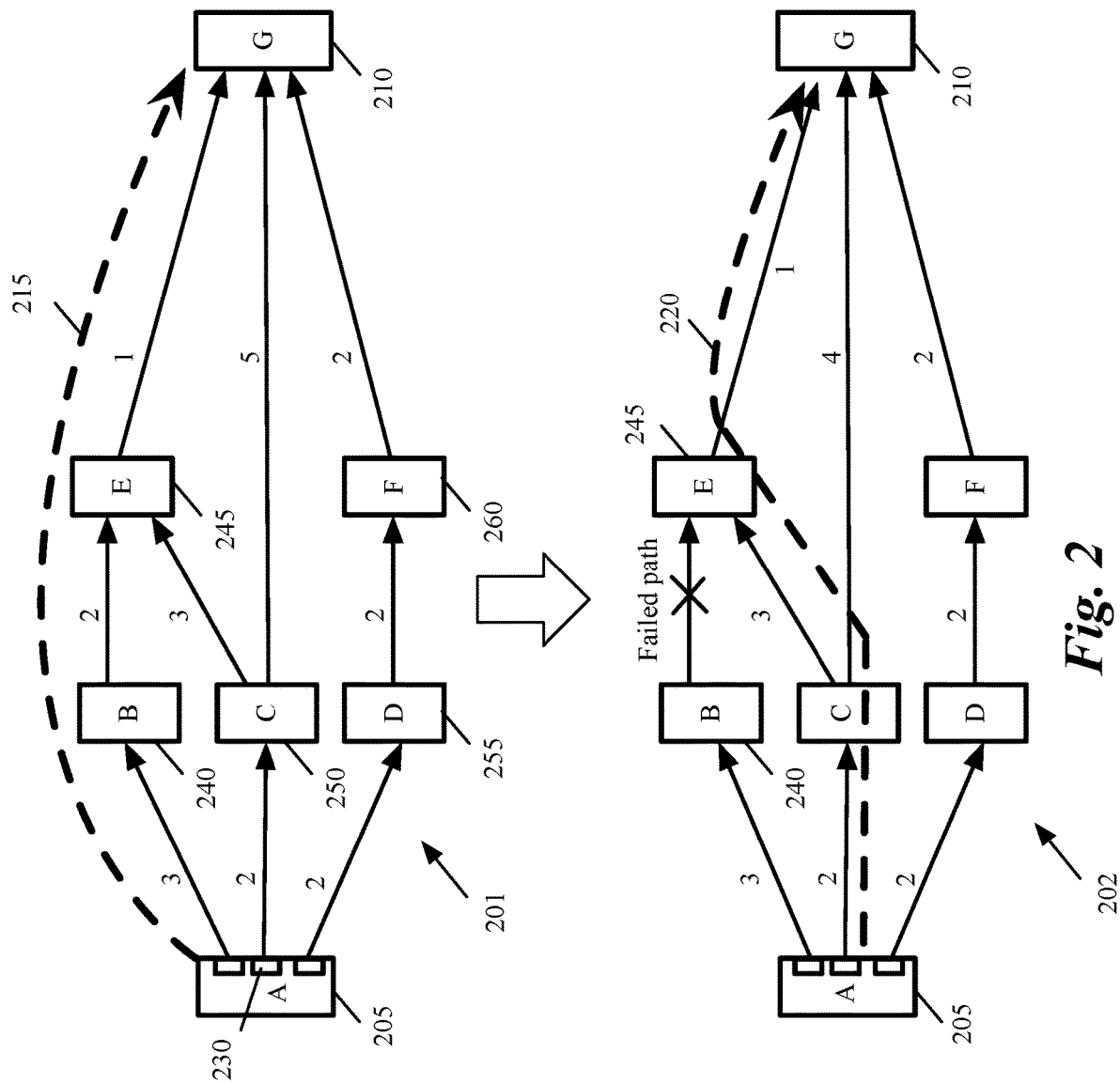
FIG. 2 illustrates ECMP routing for forwarding packets from a forwarding element to a destination over several different paths.

ECMP is a routing strategy that selects the next hop for forwarding a packet to the final destination in such a way to minimize the overall cost (e.g., the required time or the network congestion) for forwarding the packet to the final destination. FIG. 2 illustrates ECMP routing for forwarding packets from a forwarding element 205 to a destination 210 over several different paths through several hops 240-260 that can also be forwarding elements. The figure is shown in two stages 201 and 202. The cost of sending a packet through each path is written next to the path.

As shown, there are several paths such as A-B-E-G, A-C-E-G, and A-D-F-G between source A 205 and destination G 210 that cost 6 units. Each one of these paths is, e.g., a separate open system interconnection (OSI) Layer 3 (L3) path where packets can be sent through. In stage 201 the path A-B-E-G (as shown by arrow 215) is utilized to send packets for one or more flows between source A 205 and destination G 210. As shown, multiple paths can be on the same OSI Layer 2 (L2) port of a forwarding element. For instance, in FIG. 2, both paths A-C-E-G and A-C-G are on port 230 of forwarding element 205.

In stage 202, the path between hops B 240 and E 245 fails. According to ECMP strategy, another route between the source 205 and the destination 210 is selected to keep the transmission cost at a minimum. As shown, forwarding element A 205 selects the path A-C-E-G 220 to replace path 215.

B. Forwarding the Packets using LAG

Figure 3:
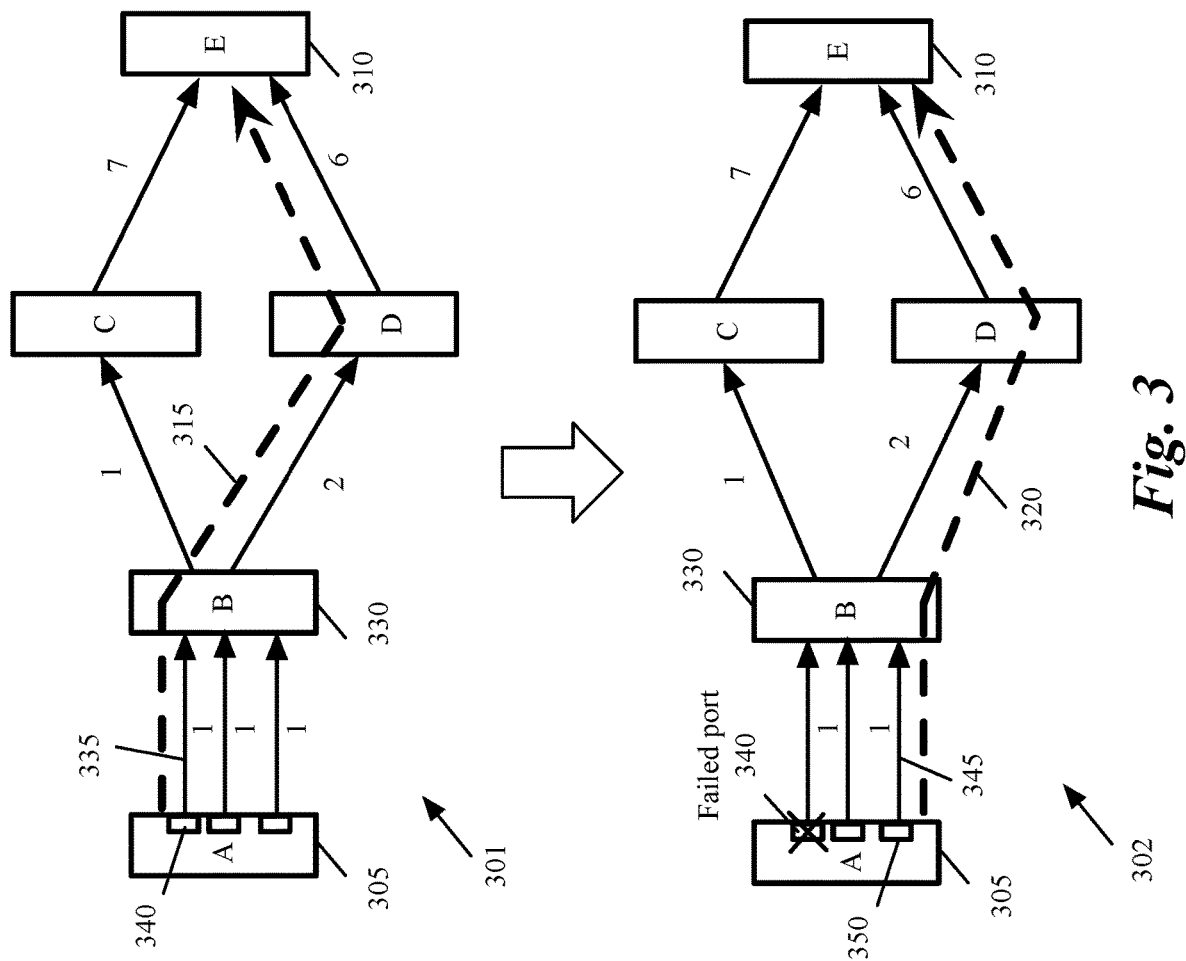
FIG. 3 illustrates link aggregation as another example of forwarding packets from a forwarding element to a destination over several different paths.

FIG. 3 illustrates LAG as another example of forwarding packets from a forwarding element to a destination over several different paths. LAG combines multiple network connections in parallel to provide throughput and redundancy. The figure is shown in two stages 301 and 302. The cost of sending a packet through a path is written next to each path. As shown, there are several paths between forwarding element A 305 and hop B 330 (which could be another forwarding element) that have equal cost. These paths, e.g., use OSI Layer 2 (L2) ports on forwarding element 305 that are on one logical channel bundle. These paths provide parallelism to increase throughput as well as redundancy.

As shown in stage 301, the path A-B-D-E 315, which passes through path 335 between port 340 of forwarding element 305 and hop 330 is used to pass packets for one or more flows from forwarding element A 305 to destination E 310. In stage 302 port 340 fails. As a result, link 335 becomes inaccessible. As shown, another path 320 (which includes the link 345 between port 350 of forwarding element 305 and hop 330) is selected to replace the failed path 315.

In addition to the examples of ECMP and LAG, it is possible that several tunnels go through the same egress port of the forwarding element. Even if the port remains functional, one of the tunnels may fail several hops away downstream. Similar to the examples of FIGS. 2 and 3, the failed path has to be replaced with another path despite the fact that the egress port is still operational.

C. Link Status Table

Some embodiments maintain the status of each egress link of a forwarding element in a data structure that includes a flag (e.g., one bit) per link. The value of the bit indicates whether the corresponding link is up or down. For instance in some embodiments a value of 1 indicates that the corresponding link is operational and a value of 0 indicates that the corresponding link is down. In other embodiments, a value of 0 may be used to indicate that a link is operational and a value of 1 to indicate a link is down.

Figure 4A:
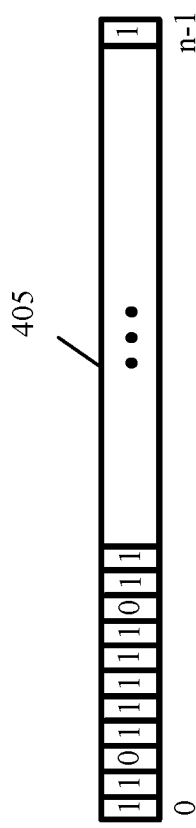
FIG. 4A conceptually illustrates a logical view of a vector that shows the status of the egress links of a forwarding element in some embodiments.

FIG. 4A conceptually illustrates a logical view of a data structure (e.g. a vector) that shows the status of the egress links of a forwarding element in some embodiments. As shown, vector 405 is an array of n bits. Each bit corresponds to a configured egress link (i.e., a port or a path) of the forwarding element. The status of each link is represented by the value of the corresponding bit. When a link is up and operational, the corresponding bit is set to on (e.g., is set to 1) to indicate that the link is live. On the other hand, when a link is down, the corresponding bit is set to off (e.g., is set to 0) to indicate that that link has failed and is not available. Vector 405 in some embodiments is stored in memory as a group of one or more words.

Figure 4B:
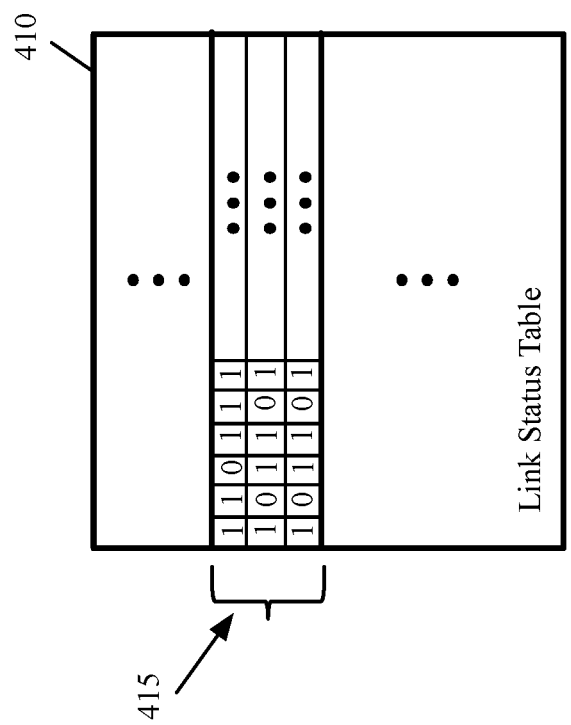
FIG. 4B conceptually illustrates an implementation of the logical vector of FIG. 4A.

FIG. 4B conceptually illustrates an implementation of the logical vector 405 of FIG. 4A. As shown, some embodiments utilize a link status table in an area of memory 410 (referred to herein as the live link vector table) for storing the status of the links. The memory used to store table 410 in some embodiments is a dual port memory that is capable of being read and written by hardware. The dual port memory is also capable of being written by software. In contrast, a random access memory (RAM) is read by hardware but is written only by software. For instance the software writes into a buffer, which is in turn transferred into the RAM.

The dual port memory used to store the live link vector table 410 in some embodiments is implemented from single port static random-access memory (SRAM) units. These embodiments utilize a map RAM (e.g., a small SRAM of 1024 entries by 11 bits) for each unit SRAM. The map RAM stores whether the corresponding unit SRAM has the most up to date data for a memory address. Simultaneous read and write operations are performed as follows.

The read operation is performed by (1) presenting the address to read to all map RAMs, (2) the map RAM with the data to be read signals that its associated unit (e.g., SRAM S1) holds the most up to date data, (3) the unit SRAM S1 is read at the corresponding address. Since the write operation cannot be performed with the same unit where the data currently resides (because the single port of SRAM S1 is occupied by a read), the write is performed by (1) querying the map RAMs to determine which unit SRAM is not busy and has the specified address available for write operation, (2) writing the data to the free SRAM (e.g. SRAM S2), (3) updating the map RAM associated with unit SRAM S2 to indicate unit SRAM S2 has the most up to date version of the data, and (4) updating the map RAM associated with unit SRAM S1 to indicate the address in SRAM S1 is now available for write operations (since the data in SRAM S1 is now stale).

As shown, table 410 includes several groups of live link vectors. Each group is being used by one application (or one user). For instance, group 415 includes several live link vectors (e.g., 128 bits each). Group 415 maintains the status of the links used by one application that utilizes a forwarding element such as forwarding element 105 in FIG. 1.

Once a link such as path 215 in FIG. 2 or port 340 in FIG. 3 fails, a typical solution in prior art forwarding elements is for software in control plane to mark the link as failed and select an alternative link to replace the failed link. Utilizing software to mark a link as failed and determine a replacement link is, however, time consuming and slow. For instance, marking the link as failed by software may take several milliseconds. Accordingly, some embodiments provide a technique to quickly mark a failed link by performing a set of hardware operations in the data link (e.g., in the order of a few microseconds) and route packets to an alternative link without software involvement.

D. Detecting and Marking a Failed Link

Figure 5:
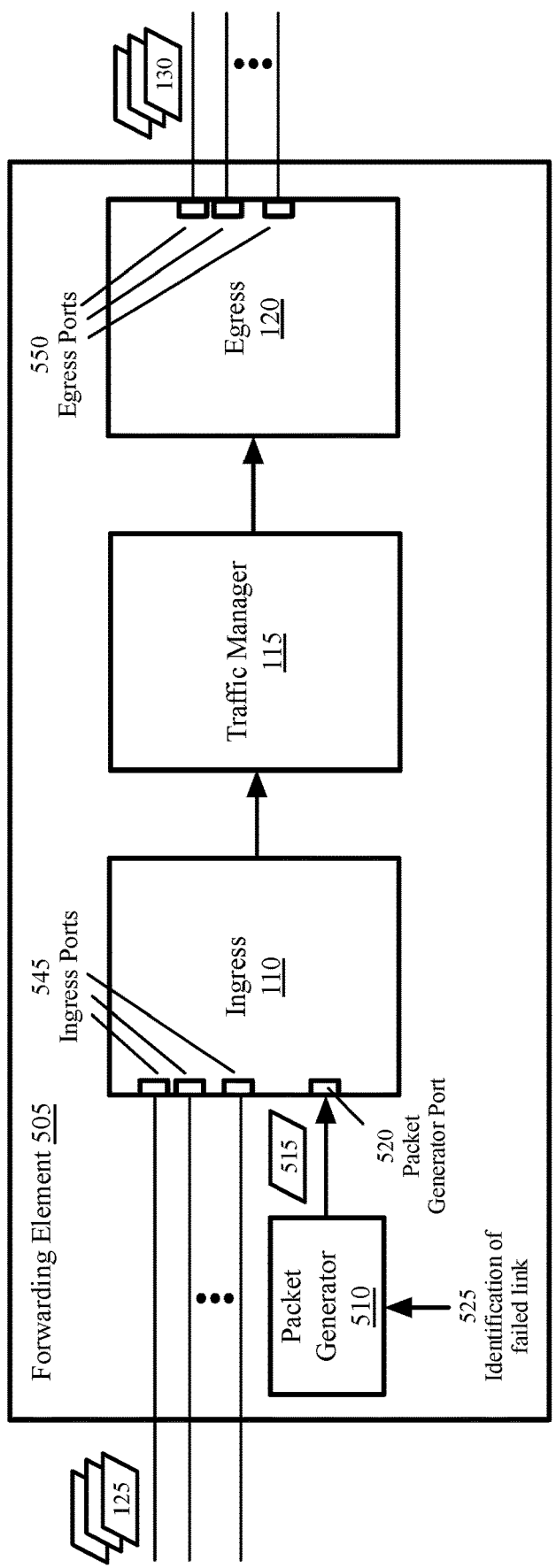
FIG. 5 conceptually illustrates a block diagram of a hardware forwarding element that is capable of marking failed links by performing a set of hardware operations in the data plane in some embodiments.

FIG. 5 conceptually illustrates a block diagram of a hardware forwarding element 505 that is capable of marking failed links by performing a set of hardware operations in the data plane in some embodiments. As shown, in addition to ingress pipeline 110, traffic manager 115, and egress pipeline 120, the forwarding element includes a packet generator 510. The packet generator is capable of generating packets internally in the forwarding element and sending the packets through the packet pipeline. As shown, the ingress packets 125 are received at the ingress pipeline 110 through a set of ingress ports 545 while packets 515 that are generated by the packet generator are received at the ingress pipeline at a separate port 520.

As shown, packet generator 510 receives the identification 525 of failed links. For instance, when a forwarding element's port fails, some embodiments generate an interrupt that provides the identification of the failed port. The interrupt is used to provide the identification of the failed port to the packet generator. As another example, the packet generator may receive an identification of a failed path (such as path 215 in FIG. 2) when a portion of the path that is several hops away fails. For instance, the packet generator receives a hardware signal when the failure of a keep alive signal indicates a portion of an egress path has failed.

Figure 6:
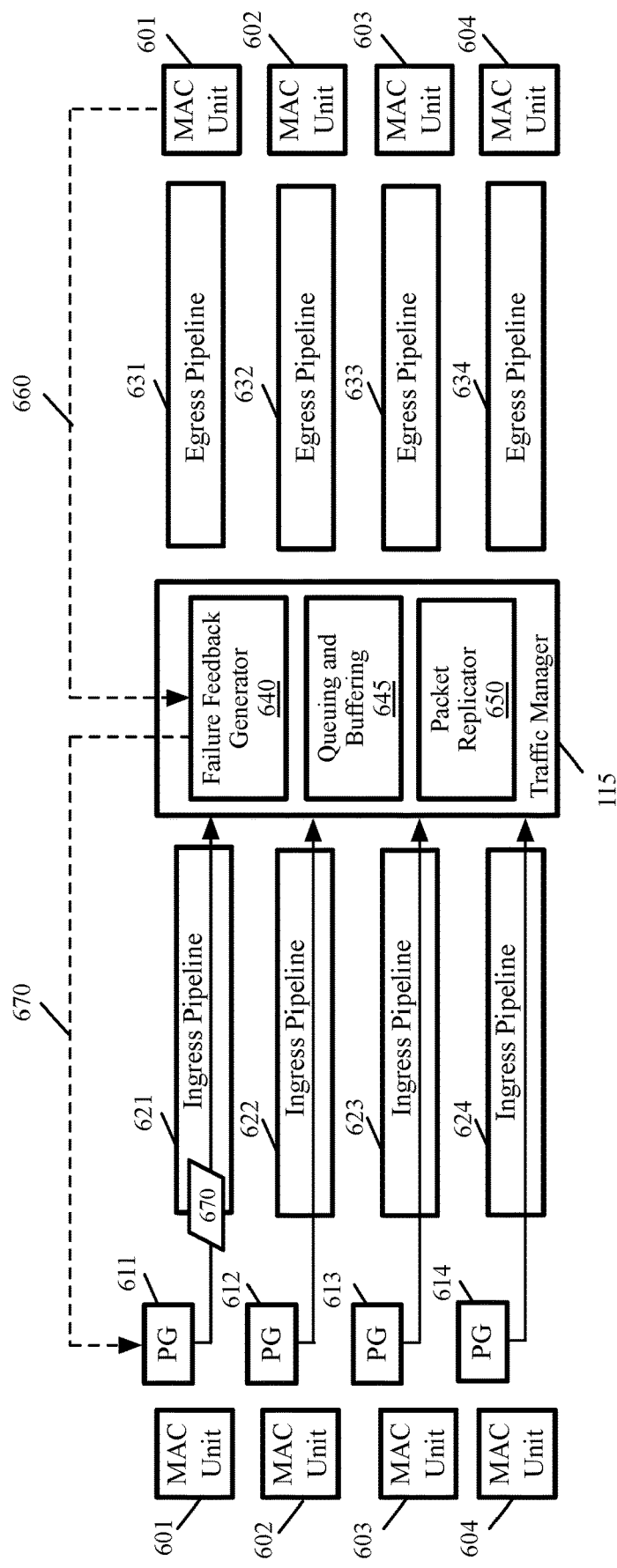
FIG. 6 conceptually illustrates a portion of a hardware forwarding element used for detecting a port failure and reporting the failure to the packet generator in some embodiments.

FIG. 6 conceptually illustrates a portion of a hardware forwarding element used for detecting a port failure and reporting the failure to the packet generator in some embodiments. The figure shows traffic manager 115, several ingress pipelines 621-624 (each pipeline similar to pipeline 110 in FIG. 5), several egress pipelines 631-634 (each pipeline similar to pipeline 120 in FIG. 5), and several packet generators 611-614 (each packet generator similar to packet generator 510 in FIG. 5). Each packet generator 611-614 is associated with one ingress pipeline 621-624. For instance, packet generator 611 is associated with ingress pipeline 621.

The figure also shows several media access control (MAC) units 601-604 to monitor ingress and egress ports. In some embodiments, one MAC unit is utilized for monitoring both the ingress and the egress ports of a pipeline. For instance, the blocks labeled MAC unit 601 next to the ingress pipeline 621 and the egress pipeline 631 are one MAC unit which are shown in FIG. 6 as two separate blocks for clarity. In other embodiments, separate MAC units are utilized to monitor the ingress and egress ports of each pipeline. Once an egress port fails, the corresponding MAC unit 601-604 informs traffic manager 115 using a hardware signal (as conceptually shown by arrow 660).

As shown, traffic manager 115 has several components: a queuing and buffering system 645, a packet replicator 650, and a failure feedback generator 640. As described above, the queuing and buffering system provides a large shared buffer that accommodates the queuing delays due to oversubscription of the output channels of the ingress deparser. Port failure feedback generator 640 receives a hardware signal from the MAC unit that detects a port failure.

In the example of FIG. 6, MAC unit 601 detects that the egress port (not shown) being monitored by the MAC unit has failed. MAC unit 601 sends a signal 660 to the port failure feedback generator 640. The port failure feedback generator 640 in turn generates a hardware signal (as conceptually shown by arrow 670) to the packet generator 611 connected to the ingress pipeline 621 and egress pipeline 631 that are associated with the failed port. The hardware signal includes the identification of the failed port. For instance the port failure feedback generator in some embodiments identifies the failed port based on which MAC unit has reported the failure. In other embodiments, the signal from a MAC unit (e.g., a MAC unit that monitors several ports) to the failure feedback generator includes an identification of the failed port (e.g., in the form of an n bit of information that uniquely identifies the failed port). The failure feedback generator then sends a signal to the packet generator and includes the identification of the failed port (e.g., in the form of an m bit of information that uniquely identifies the failed port).

The packet generator 611 then generates a packet 670 that is placed in ingress pipeline 621. As described below, the packet 670 cause the status bit corresponding the failed port to be set to off. All actions of detecting that a port has failed by a MAC unit (such as MAC unit 601), sending a signal from the MAC unit to the traffic manager 115, sending a signal from the traffic manager to a packet generator (such as packet generator 611), generating a packet (such as packet 670) by the packet generator, and setting the status bit of the failed port to off are done by hardware and firmware in the data plane of the forwarding element without using the control plane or software.

Referring back to FIG. 5, the figure shows one of the ingress pipeline, egress pipeline, and packet generators of FIG. 6. Once the packet generator 510 receives the identification of a failed link, the packet generator generates a packet 515 that includes the identification of the failed link in a predetermined location in the packet header. The packet goes through the MAU match-action stages and matches a predefined match field. The action corresponding to the match field causes a preprogrammed action unit in the forwarding element to use the failed link identification and compute an index to the status bit of the failed link in the live link vector table and to set the bit to off (i.e., to indicate that the link has failed).

The hardware forwarding element of some embodiments processes network packets according to a series of match-action tables that specify when to perform certain operations on the packets. The match-action tables include match entries that specify sets of match conditions that can be met by packets, and corresponding action entries that specify operations to perform on packets that meet the match conditions.

As an example, the match entry of a match-action table might match on the identification of a failed link. The corresponding action entry might specify that the status bit of the link in the live link vector table has to be set to off. As another example, a match-action table might match on the destination address of an ingress packet and specify an output port to which to send the packet. Different destination addresses (i.e., different match entries) correspond to output actions to different ports (i.e., different action entries) of the forwarding element.

In some embodiments, the forwarding element includes a set of unit memories (e.g., SRAM and/or ternary content-addressable memory (TCAM)). The unit memories implement a match-action table by having a first set of the unit memories store the match entries and a second set of the unit memories store the action entries. That is, for a particular match entry and the corresponding action entry, the match entry is stored in a first unit memory and the action entry is stored in a second unit memory.

Some embodiments arrange the unit memories in a grid of rows and columns, with horizontal and vertical routing resources that connects the unit memories to arithmetic logic units (ALUs), also referred to as action units, that read the data from the unit memories in order to perform the match and action operations. In some such embodiments, a first pool of unit memories within a grid (e.g., a set of one or more columns of the grid) are utilized for the match entries, and a second pool of unit memories within the grid are utilized for the action entries. Some embodiments assign other functions of the forwarding element to unit memories within the grid as well, including statistics, meters, state, ternary indirection, etc. In some embodiments, the match memories are segregated (assigned to a specific set of columns, such as those closest to the ALUs) while the remaining memories in the grid are used for implementing memories for other functions (statistics, meters, etc.).

Each match entry of some embodiments includes two portions: the set of match conditions for a packet to meet, and an address of the action entry to read when the set of match conditions is met by a packet. The address, in some embodiments, specifies both a memory page that indicates a unit memory within the grid of unit memories, and a location within that memory page.

Figure 7:
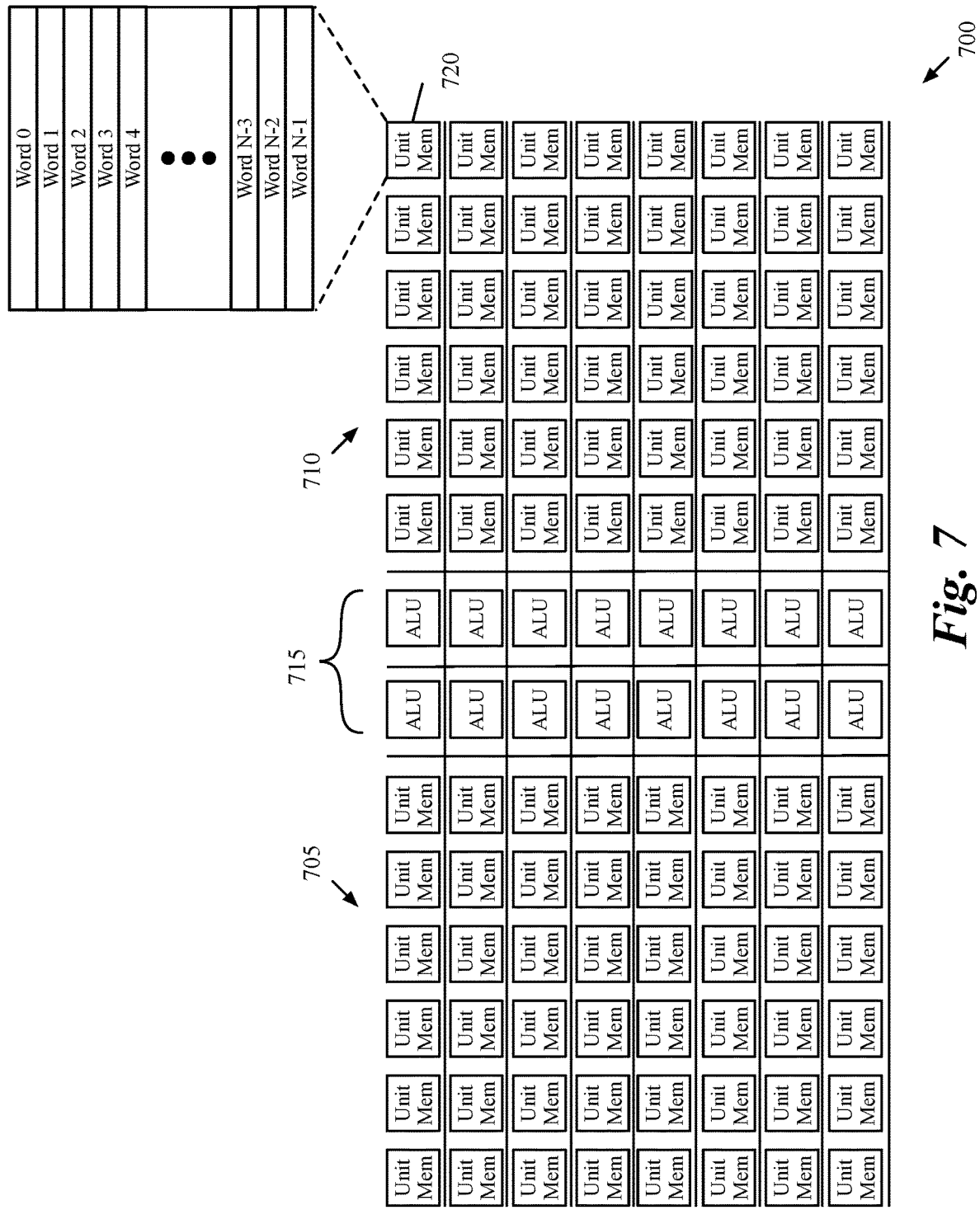
FIG. 7 conceptually illustrates a grid of unit memories in some embodiments.

FIG. 7 conceptually illustrates a grid 700 of unit memories in some embodiments. Specifically, this example shows 96 unit memories arranged in 16 logical rows, with each row associated with an arithmetic logic unit (ALU) 715. The 16 logical rows are divided into two separate grids 705 and 710 of eight rows, having six columns in each of the two separate grids. It should be understood that the arrangement of memories shown in FIG. 7 is only one of many examples of the possible arrangements of unit memories to implement match-action tables in a forwarding element, and that the inventive concepts described herein are applicable to many such arrangements.

These unit memories, in some embodiments, each have a number of memory locations, or "words" that can be read by the ALUs. The wiring that allows ALUs to read from several different rows is described in detail in the U.S. Provisional Application 62/108,409, filed Jan. 27, 2015, which is incorporated herein by reference. As shown for one of the unit memories 720, each memory includes N locations, from Word 0 to Word N-1. In some embodiments, these locations each have a fixed width based on the specific unit memories used in the grid 700, such as 64 bits, 128 bits, 256 bits, etc. The ALUs 715 in some embodiments read one memory location per unit memory in a given clock cycle.

In some embodiments, each of the unit memories has a designated function. For instance, a first unit memory might store match entries, while a second unit memory stores the action entries that correspond to the match entries of the first unit memory. In addition, the unit memories may store other data for a match-action based forwarding element, including meters (used to measure data flow rates) and statistics (e.g., counters for counting packets, bytes, etc.).

Referring back to FIG. 5, the match-action table of the MAU includes a match entry to match the identification of each egress link. Matching the link identification and performing of the corresponding action (if there is a match) is performed by one of the ALUs. The corresponding action entry causes the ALU to use the failed link identification included in the packet and compute an index to the status bit of the failed link in the live link vector table. The action also causes the ALU to set the bit to off (i.e., to indicate that the link has failed). After the live link vector table is updated, the packet is not needed and is dropped without being sent out from one of the egress ports 550.

Figure 8:
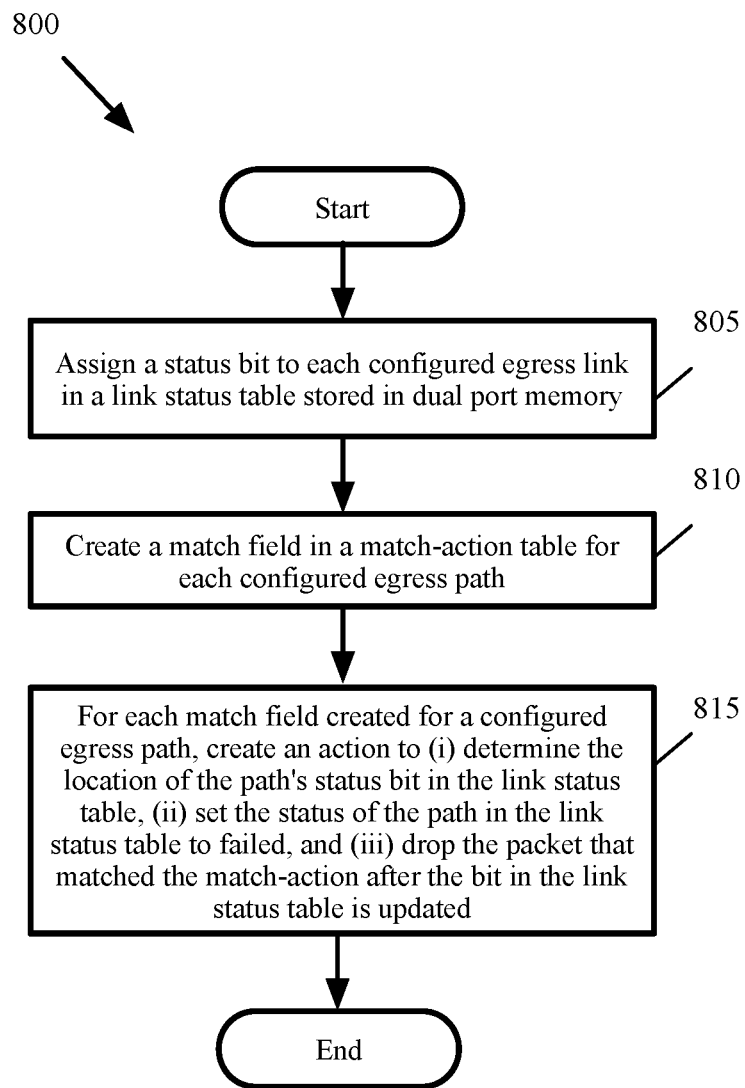
FIG. 8 conceptually illustrates a process for assigning status bits to a forwarding element's egress links and programming match-action entries to set the status of a failed link to failed.

FIG. 8 conceptually illustrates a process 800 for assigning status bits to a forwarding element's egress links and programming match-action entries to set the status of a failed link to failed. Process 800 in some embodiments is performed when the hardware forwarding element is deployed and an initial set of egress links are configured. The process is also performed each time a new link is configured in order to update the match-action table.

As shown, the process assigns (at 805) a status bit in the link status table (e.g., the live link vector table 410 in FIG. 4) for each configured egress link of the forwarding element. As described above, the link status table in some embodiments is stored in dual port memory that is capable of being written by either hardware or software. The process also optionally sets the status of all links to operational (e.g., sets the status bits to 1).

For each configured egress link, the process creates (at 810) a match field in a match-action table of the MAU to match the identification of the link. Next, for each configured egress link, the process creates (at 815) the corresponding action to (i) determine the location of the link's status bit in the link status table based on the link identification in a predetermined field of the packet header, (ii) set the status of the link in the link status table to failed (e.g., to set the bit to 0), and (iii) drop the packet after the bit in the link status table is updated. The process then ends.

Process 800 in some embodiments utilizes a programming language that is designed to program packet forwarding data planes in order to program the match-action table. For instance, some embodiments utilize a programming language such as P4, which is used for programming protocol-independent packet processors. P4 language works in conjunction with protocols such as OpenFlow and is designed to program the match-action tables.

Figure 9:
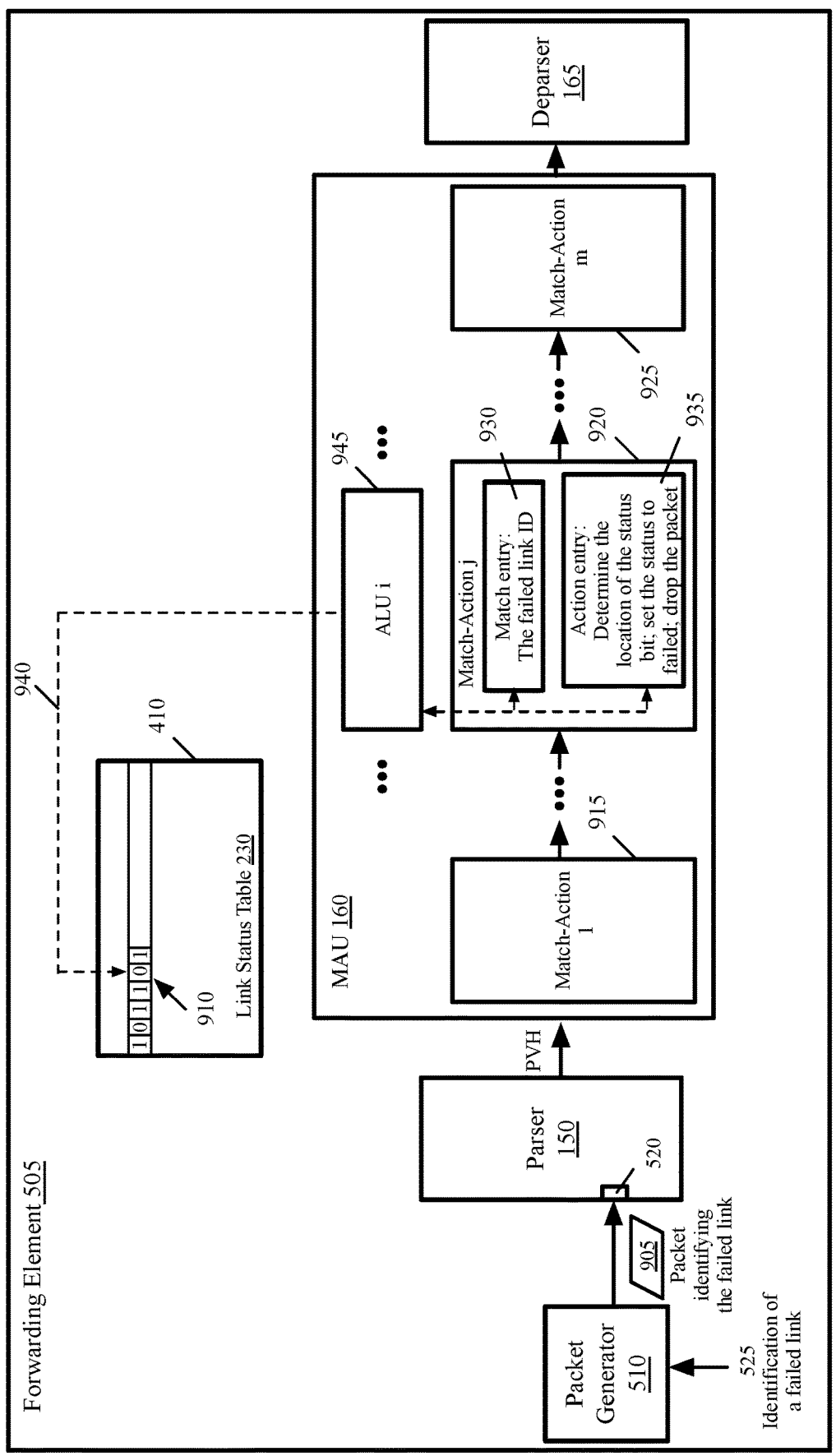
FIG. 9 conceptually illustrates the steps that the hardware forwarding element of FIG. 5 takes to mark a failed link in data plane in some embodiments.

FIG. 9 conceptually illustrates the steps hardware forwarding element 505 of FIG. 5 takes to mark a failed link in data plane in some embodiments. The figure shows the ingress pipeline of the forwarding element. As shown, packet generator 510 receives the identification 525 of a failed egress link (i.e. a failed egress path or port). The packet generator generates a packet 905 that includes the identification of the failed link (or the failed port) in a predetermined field of the packet header. In other words, the packet includes a specific signature for the failed link that is used to match a preprogrammed match field of a match-action table in the MAU. The packet is then placed into the packet pipeline of the forwarding element through the packet generator port 520. The parser 150 then parses the packet header and creates a PHV. One of the registers or containers in the PHV includes the identification of the failed link.

Figure 10:
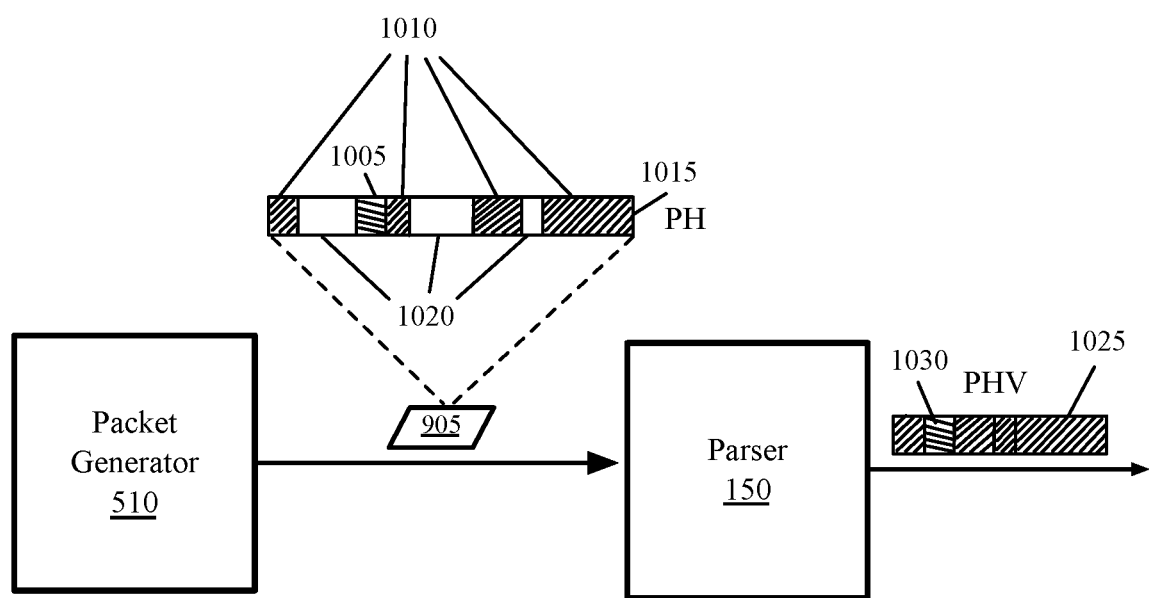
FIG. 10 conceptually illustrates a process that a forwarding element performs in data plane in order set the status of a failed link to failed in some embodiments.

FIG. 10 conceptually illustrates generation of a PHV by a parser from a packet that is generated by a packet generator in some embodiments. As shown, the packet generator 510 generates a packet 905 that includes the identification of the failed link in a predetermined field 1005 of the packet header 1010. In this example, other fields of the packet header do not include relevant information.

When a packet is received by the parser 150, the parser parses the packet headers into the PHV 1025. However, not every header field of each packet header is needed by the MAU stages of the upcoming ingress or egress pipeline to which the parser sends the PHV. For instance, some of the packet header fields will (i) not be matched against by any of the match entries of the match tables in the pipeline and (ii) not be modified by any possible action entry that could be performed in the pipeline. Thus, as the parser 150 extracts each packet header from a packet, the parser determines which of the header fields of the packet header might be processed by at least one of the match-action stages of the MAU.

The illustrated example shows that a packet header 1015 of the packet 905 includes several participating header fields 1005-1010 that the MAU is configured (e.g., by a configurator module of the control plane) to potentially process. At the same time, the packet header 1015 also includes several other non-participating header fields 1020 that the MAU is not configured to process. In some embodiments, when the parser 150 extracts a particular packet header from a packet, the parser must extract the entire contiguous packet header at once (i.e., the parser cannot leave certain fields of a packet header in the payload while placing the other fields of the packet header in the PHV). Because the different participating header fields of the packet header are often not placed next to each other in the packet header (as illustrated in the figure), the parser of some embodiments separates these participating header fields from nonparticipating fields during extraction of the packet header.

For example, the MAU might be configured to process only a particular set of header fields in a UDP packet header, which may not be the first two header fields of the packet header (i.e., the source and destination ports). In such a case, the parser locates the particular header fields in the set, pulls these fields out of the packet header, and stores the header fields in the PHV. However, the other nonparticipating header fields that are also extracted from the packet have to be dealt with as well. Therefore, in some embodiments, the parser looks at each header field in the packet header and determines whether the identified header field might be processed by the MAU or will definitely not be processed by the MAU.

If the parser 150 determines that the header field is one of the participating header fields, the parser stores the header field in the PHV 1025 (i.e., in a particular set of registers or containers of the PHV 1025 designated for that header field). On the other hand, if the parser determines that the identified header field is not supposed to be processed by the MAU, the parser stores the header field in a separate structure (not shown) that is subsequently sent directly to the deparser of the pipeline without getting processed.

The parser of some embodiments determines which fields of each packet header may be processed and which fields will not be processed by the MAU, based on the information the parser receives from the packet itself (e.g., by one or more particular packet header of the packet), and based on the configuration data that is received, for example, from a compiler in the control plane. In some embodiments, the compiler receives the data required for configuring the pipeline (e.g., through a programing language code such as the above-mentioned P4 language), generates a set of configuration data, and distributes the generated data to a configurator module (also in the control plane). The configurator module then distributes the configuration data to both parser and MAU of the pipeline in the forwarding element (e.g., at run-time or during setup time). For the packet 905 that is generated by the packet generator 510 for the purpose of identifying a failed link, the relevant information 1005 is in a predetermined field of the packet header 1015. This information is extracted by the parser 150 and is placed in a predetermined register (or container) 1030 of the PHV 1025.

Referring back to FIG. 9, the PHV passes through the pipeline of match and action stages 915-925. One of these match-action stages 920 is preprogrammed (e.g., as described above by reference to process 800) to match the identification of the failed link included in the PHV. The match entry 930 matches the identification of the failed link. The corresponding action entry 935 includes instructions for an ALU 945 (as described above by reference to FIGS. 7 and 8) to (i) determine the location of the link's status bit in the link status table 230 based on the link identification in a predetermined field of the packet header, (ii) set the status of the link in the link status table to failed (e.g., to set the bit to 0), and (iii) drop the packet after the bit in the link status table is updated.

Depending on the particular implementation of the link status table, the action entry causes the ALU to utilize the identification of the link to calculate an index to the link status table 230. For instance, for the link status table 410 shown in FIG. 4B, the ALU may calculate a pointer to the particular link vector group 415 as well as an offset to the location of the status bit that corresponds to the failed link.

The ALU in some embodiments is capable of performing operations such as writing into map RAM memory used to store the link status table 140. The ALU, therefore, sets (as shown by the dashed arrow 940 in FIG. 9) the status bit 910 that corresponds to the failed link to failed (e.g., to 0). The ALU then drops the packet, as there is not need for the packet to be sent out of an egress port.

Figure 11:
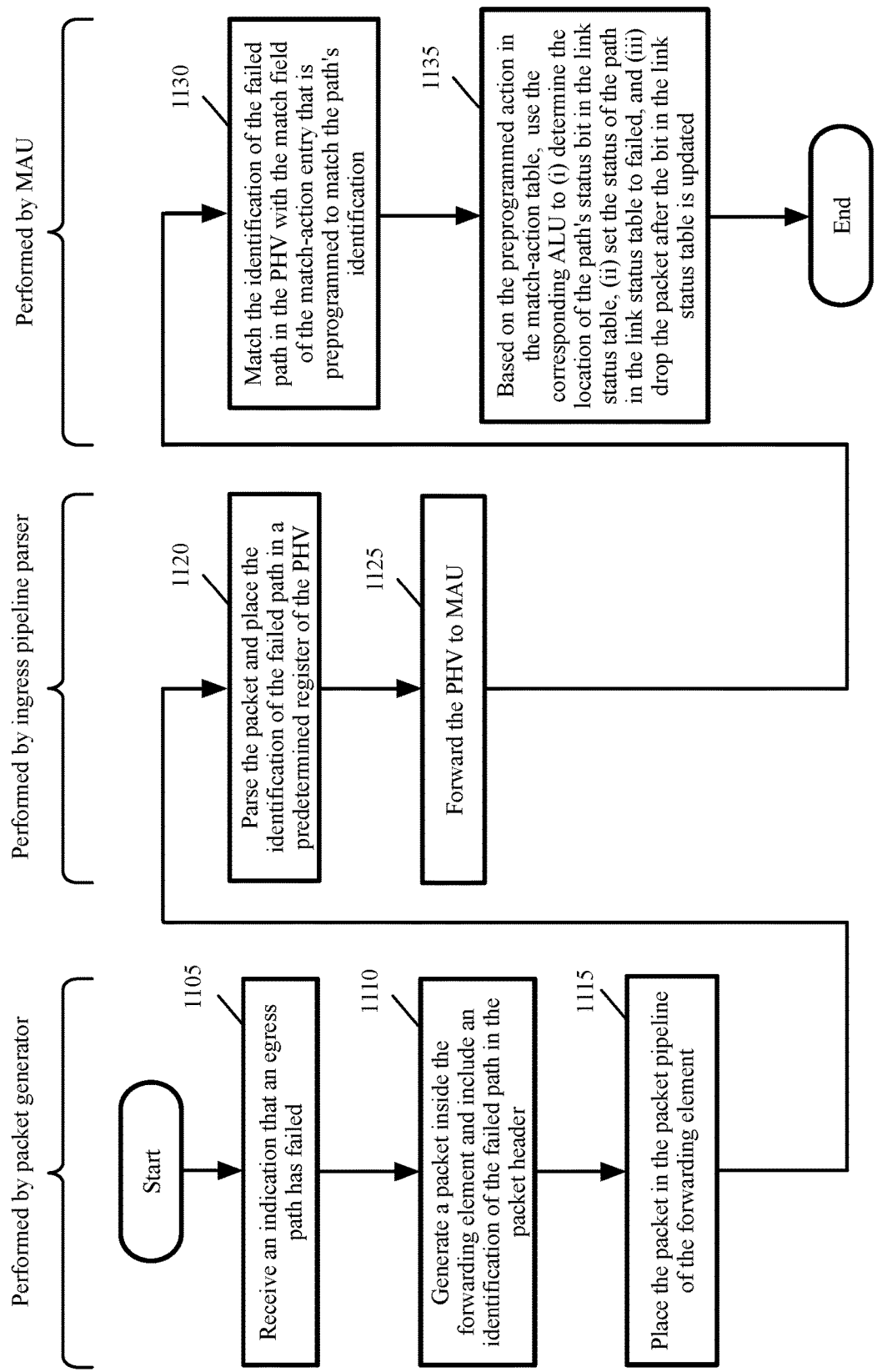
FIG. 11 conceptually illustrates a process that a forwarding element performs in the data plane in order to set the status of a failed link to failed in some embodiments.

FIG. 11 conceptually illustrates a process 1100 that a forwarding element performs in the data plane in order to set the status of a failed link to failed in some embodiments. As shown, different portions of the process are performed by the packet generator, the ingress pipeline parser, and the MAU of the forwarding element.

The process receives (at 1105) an indication (e.g., as shown by 525 in FIGS. 5 and 9) that an egress link of the forwarding element has failed. The process then generates (at 1110) a packet inside the forwarding element (e.g., packet 905 generated by the packet generator 510 in FIG. 9). The process includes an identification (or signature) of the failed link in the packet header. For instance, the process places the identification in the field 1005 of the packet header 1015 as shown in FIG. 10.

The process then places (at 1115) the packet in the packet pipeline of the forwarding element. For instance, the process places packet 905 through the packet pipeline of the forwarding element as shown in FIG. 9. The process then parses (at 1120) the packet and places the identification of the failed link in a predetermined register (or container) of the PHV. For instance, the process generates the PHV 1025 and places the identification of the failed link in a register 1030 of the PHV. The process then forwards (at 1125) the PHV to the MAU.

Next, the process matches (at 1130) the identification of the failed link in the PHV with the match field of the match-action entry that is preprogrammed to match the link's identification. For instance, the process matches the identification of the failed link with the match field 930 as shown in FIG. 9.

As described above, each match field has a corresponding action. Once the identification of the failed link matches a match field, the process uses (at 1135) the action that is preprogrammed for the corresponding ALU to determine the location of the link's status bit in the link status table. For instance, for the link status table 410 shown in FIG. 4B, the process may calculate a pointer to the particular link vector group 415 as well as an offset to the location of the status bit that corresponds to the failed link.

The process also sets the bit at the determined location to fail. For example, the process sets the status bit 910 to 0 as shown in FIG. 9. Once the status bit of the failed link is updated in the link status table, the packet is no longer needed and is dropped. The process then ends.

II. Identifying a Failed Egress Port and Selecting a Backup Port in Data Plane

Some embodiments assign a backup port to each egress port. These embodiments, in data plane perform the followings: identify that a primary egress port has failed, mark the failed port, and redirect the packets that were destined to egress from the failed port to the backup port. Identifying the failed port, marking the failed port, and redirected the packets to the backup port are all done in data plane using hardware and firmware without using the control plane and software.

As described above by reference to FIG. 6, some embodiments detect a failed port by a MAC unit and send a signal to the traffic manager. The traffic manager sends a signal to the packet generator on the pipeline that corresponds to the failed port. The packet generator then generates a packet to mark the failed port in the link status table. The embodiments that utilize backup ports maintain a data structure (referred to herein as port status table) to keep track of the primary and backup ports.

Figure 12:
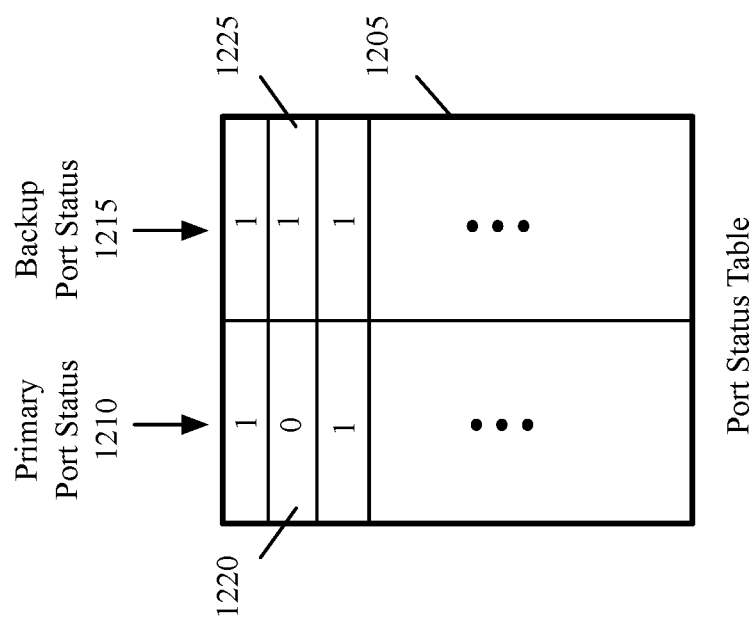
FIG. 12 conceptually illustrates a port status table of some embodiments maintained in dual port memory that is writable by hardware.

FIG. 12 conceptually illustrates a port status table of some embodiments maintained in dual port memory that is writable by hardware. As shown, some embodiments utilize an area of memory 1205 (referred to herein as the port status table) for storing the status of the port pairs. The memory used to store table 1205 in some embodiments is a dual port memory that is capable of being read and written by hardware.

As shown, table 1205 identifies the status 1210 of each primary port and the status 1215 of each backup port. Each port is associated with a flag (e.g., a bit in the table). In the example of FIG. 12, the status 1220 of a primary port is marked as failed (i.e., set to 0) while the status 1225 of the corresponding backup port is on (i.e., set to 1).

Once a port fails, a typical solution in prior art forwarding elements is for software in control plane to mark the port as failed and select an alternative port to replace the failed port. Utilizing software to mark a port as failed and determine a replacement port is, however, time consuming and slow. Accordingly, some embodiments provide a technique to quickly mark a failed port by performing a set of hardware and firmware operations in the data path and route packets to a backup port without software involvement.

Figure 13:
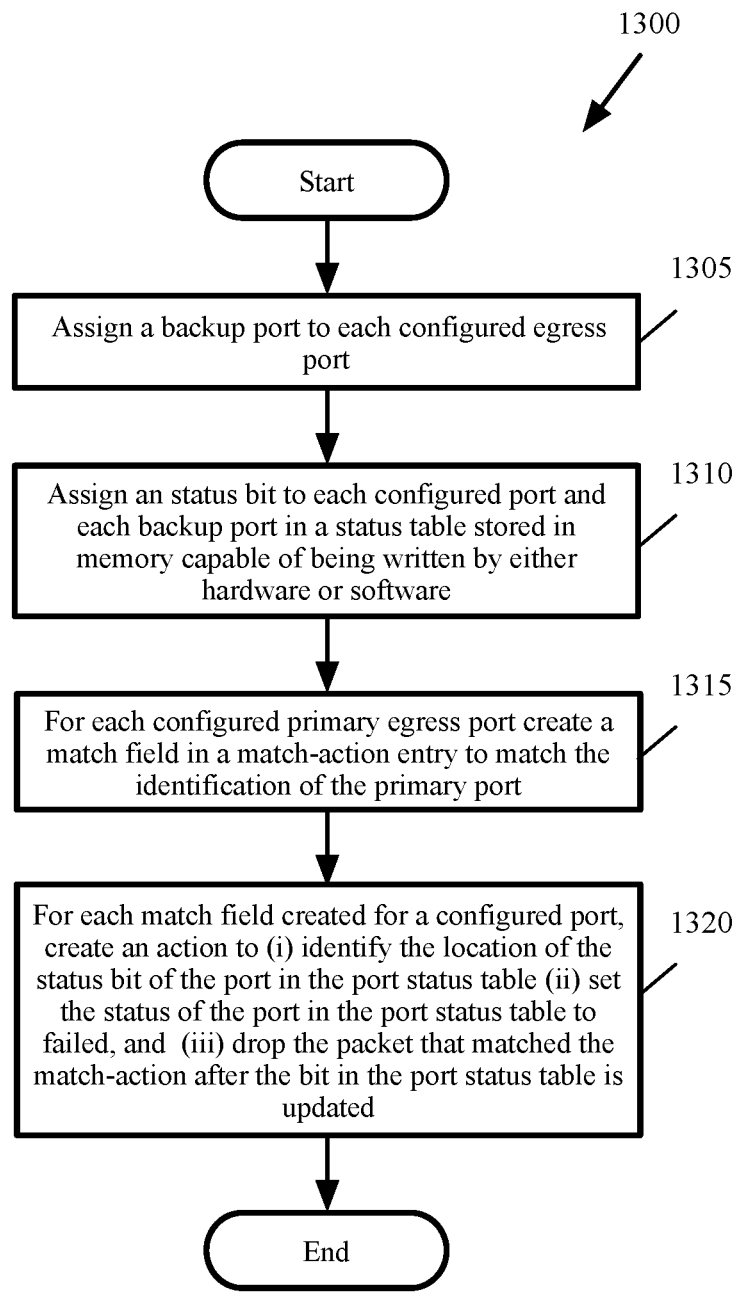
FIG. 13 conceptually illustrates a process for assigning backup egress ports for a forwarding element and programming match-action entries to set the status of a failed port to failed.

FIG. 13 conceptually illustrates a process 1300 for assigning backup egress ports for a forwarding element and programming match-action entries to set the status of a failed port to failed. Process 1300 in some embodiments is performed when the hardware forwarding element is deployed and an initial set of egress ports are configured. The process is also performed each time a new port is configured in order to update the match-action table.

As shown, the process assigns (at 1305) a backup port to each configured egress port. The process then assigns (at 1310) a status bit in a status table (e.g., the port status table 1205 in FIG. 12) to each configured primary port and each configured backup port. The status table is stored in memory that is capable of being written by either hardware or software. The process also optionally sets the status of all ports to operational (e.g., sets the status bits to 1).

For each configured primary port, the process creates (at 1315) a match field in a match-action entry to match the identification of the primary port. For each match field created for a configured port, the process creates (at 1320) an action to (i) identify the location of the status bit of the port in the port status table (ii) set the status of the port in the port status table to failed, and (iii) drop the packet that matched the match-action after the bit in the port status table is updated. The process then ends.

Process 1300 in some embodiments utilizes a programming language that is designed to program packet forwarding data planes in order to program the match-action table. For instance, some embodiments utilize a programming language such as P4, which is used for programming protocol-independent packet processors. P4 language works in conjunction with protocols such as OpenFlow and is designed to program the match-action tables.

Figure 14:
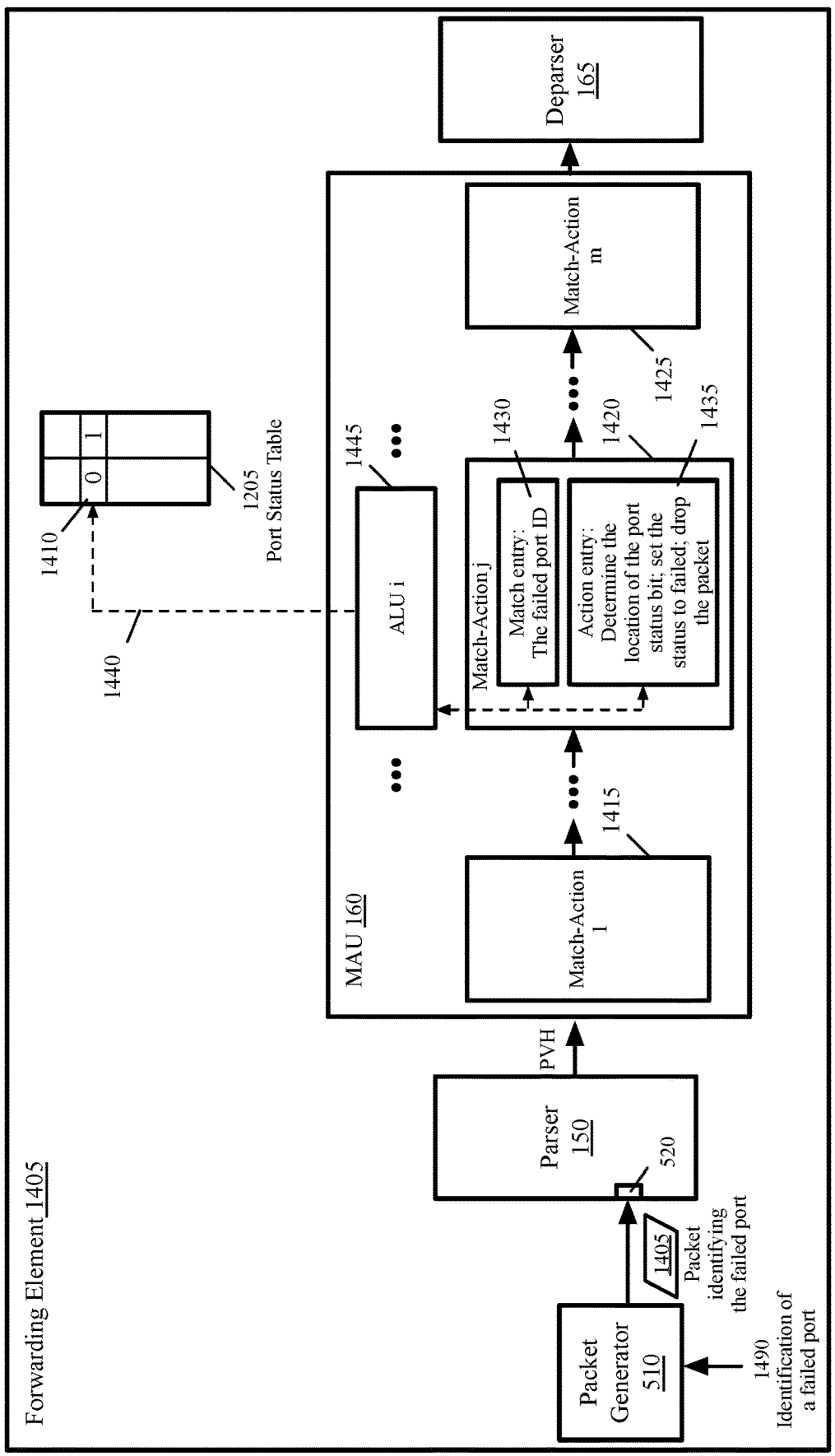
FIG. 14 conceptually illustrates the steps a hardware forwarding element takes to mark a failed port in the data plane in some embodiments.

FIG. 14 conceptually illustrates the steps a hardware forwarding element 1405 takes to mark a failed port in data plane in some embodiments. The figure shows the ingress pipeline of the forwarding element. As shown, packet generator 510 receives an identification 1490 of a failed egress port. The packet generator generates a packet 1405 that includes the identification of the failed port in a predetermined field of the packet header. In other words, the packet includes a specific signature for the failed port that is used to match a preprogrammed match field of a match-action table in the MAU. The packet is then placed into the packet pipeline of the forwarding element through the packet generator port 520. The parser 150 then parses the packet header and creates a PHV. One of the registers or containers in the PHV includes the identification of the failed port. For instance, parser includes the identification of the failed port in a register such as register 1030 of PHV as shown in FIG. 10.

The PHV passes through the pipeline of match and action stages 1415-1425. One of these match-action stages 1420 is preprogrammed (e.g., as described above by reference to process 1300) to match the identification of the failed port included in the PHV. The match entry 1430 matches the identification of the failed port. The corresponding action entry 1435 includes instructions for an ALU 1445 (as described above by reference to FIGS. 7 and 13) to (i) determine the location of the port's status bit in the port status table based on the port identification in a predetermined field of the packet header, (ii) set the status of the port in the port status table to failed (e.g., to set the bit to 0), and (iii) drop the packet after the bit in the port status table is updated.

Depending on the particular implementation of the port status table, the action entry causes the ALU to utilize the identification of the port to calculate an index to the port status table 1410. The ALU in some embodiments is capable of performing operations such as writing into map RAM memory used to store the port status table 1410. The ALU, therefore, sets (as shown by the dashed arrow 1440) the status bit 1410 that corresponds to the failed port to failed (e.g., to 0). The ALU then drops the packet, as there is not need for the packet to be sent out of an egress port.

Figure 15:
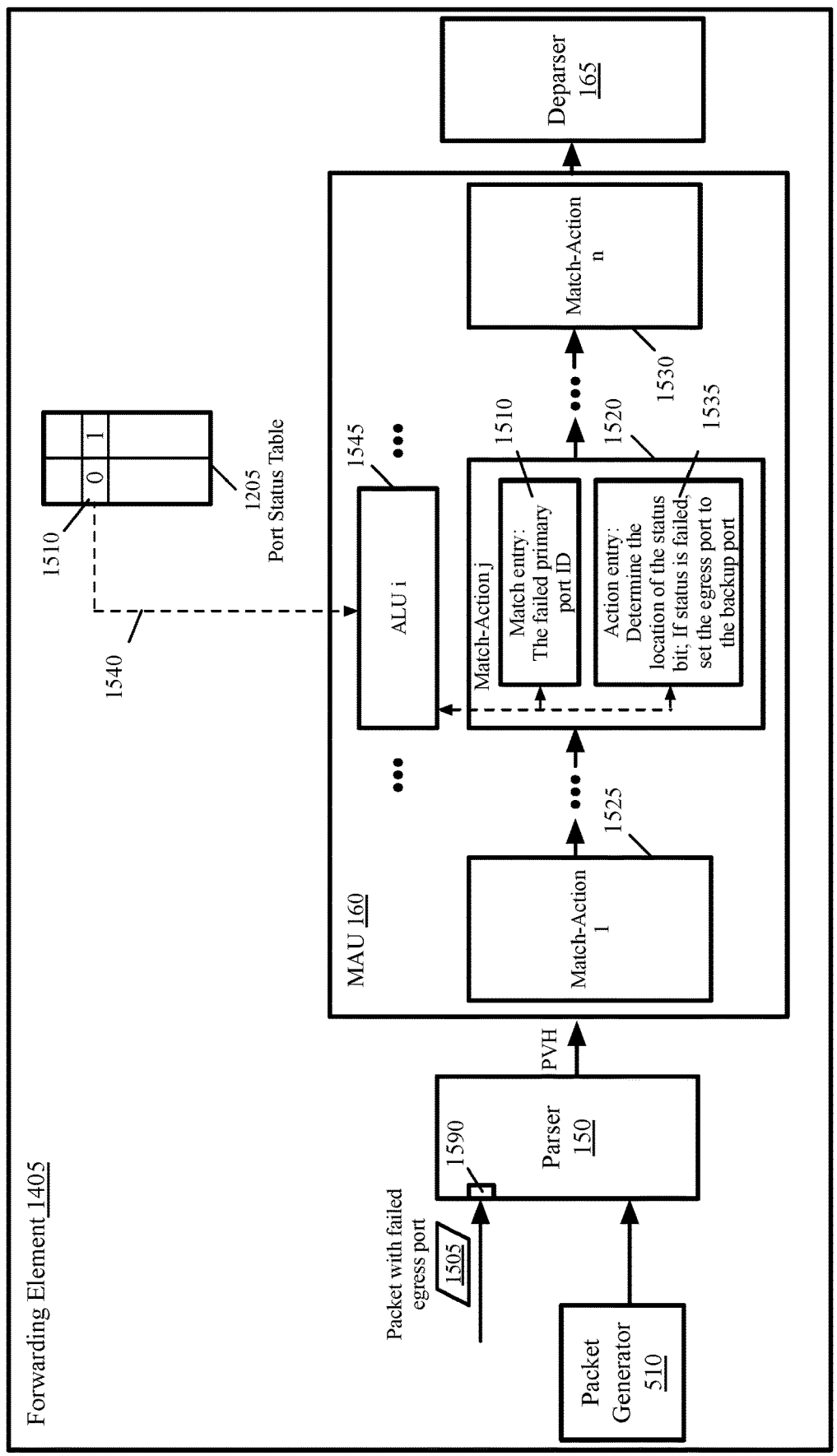
FIG. 15 conceptually illustrates the steps a hardware forwarding element takes to replace a failed primary egress port with a backup port in the data plane in some embodiments.

Once a primary egress port is marked as failed, packets that specify the failed egress port as their destination port are modified to use the backup port. This process is done in the data plane without using the control plane and software. FIG. 15 conceptually illustrates the steps a hardware forwarding element 1405 takes to replace a failed primary egress port with a backup port in data plane in some embodiments. As shown, a packet 1505 is received through an ingress port 1590. Packet 1505 is a data packet (also referred to as a user packet) that is received from outside of the forwarding element 1405. The packet is parsed by parser 150. The parser places the header fields that might be processed by at least one of the match-action stages 1525-1530 in the PHV.

In the example of FIG. 15, the egress port identified in the packet 1505 has failed and the associated status bit 1510 in the port status table 1205 has been set to off. The PHV passes through the pipeline of match and action stages 1525-1530. One of these match-action stages 1520 is preprogrammed to match the identification of the egress port included in the PHV. The match entry 1510 matches the identification of the egress port. The corresponding action entry 1535 includes instructions for an ALU 1545 to (i) determine the location of the port's status bit in the port status table based on the port identification in a predetermined field of the packet header, (ii) check whether the port status is set to failed (e.g., to 0), and (iii) if the port has failed, set the egress port of the packet to the back up port corresponding to the failed port. The packet then proceeds through the ingress and egress pipeline and sent out of the backup egress port.

Figure 16:
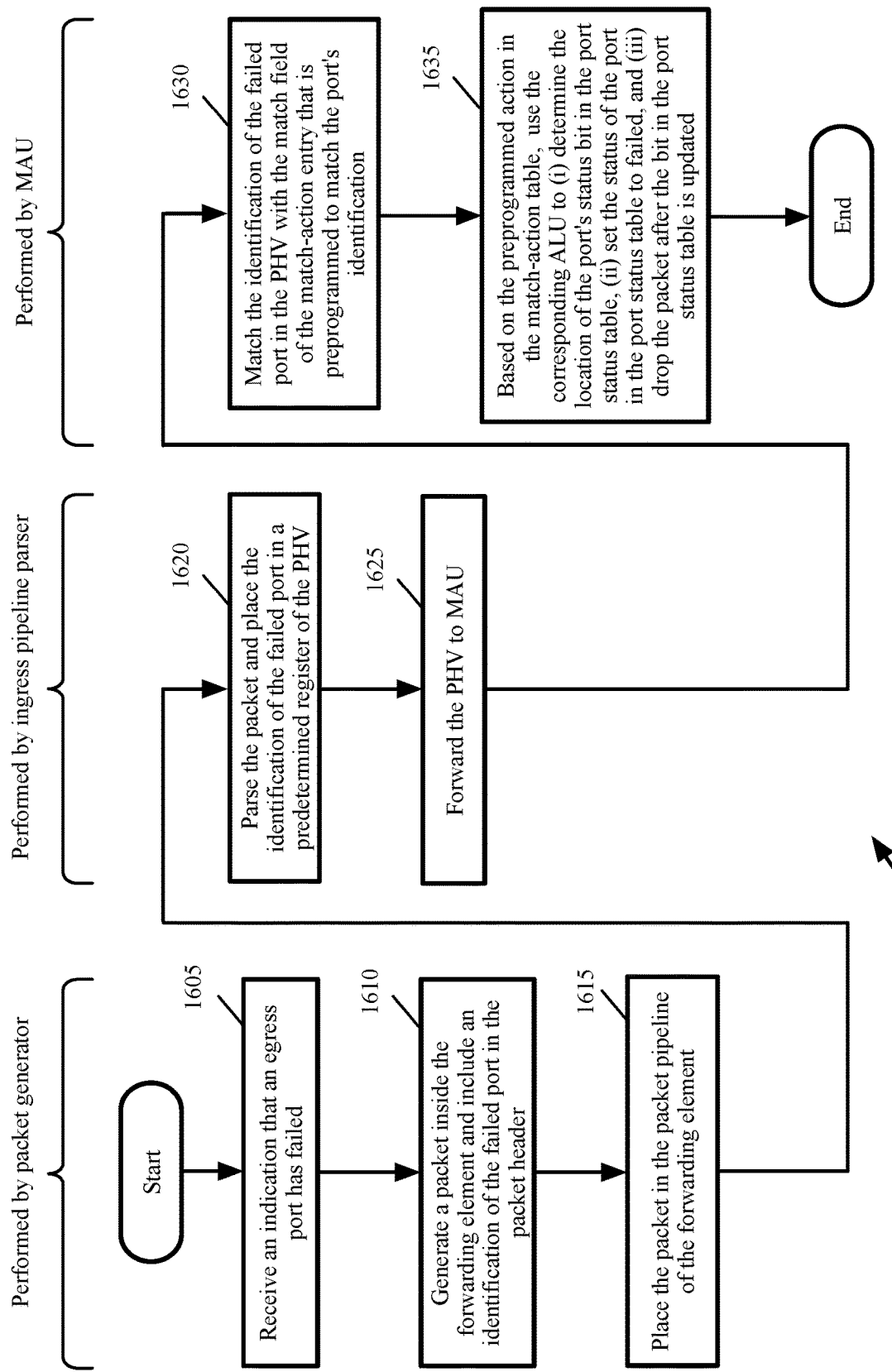
FIG. 16 conceptually illustrates a process that a forwarding element performs in the data plane in order to set the status of a failed port to failed in some embodiments.

FIG. 16 conceptually illustrates a process 1600 that a forwarding element performs in the data plane in order to set the status of a failed port to failed in some embodiments. As shown different portions of the process are performed by the packet generator, the parser, and the MAU of the forwarding element.

The process receives (at 1605) an indication (e.g., as shown by 525 in FIGS. 5 and 14) that an egress port of the forwarding element has failed. The process then generates (at 1610) a packet inside the forwarding element (e.g., packet 1405 generated by the packet generator 510 in FIG. 14). The process includes an identification (or signature) of the failed port in the packet header. For instance, the process places the identification in the field 1005 of the packet header 1015 as shown in FIG. 10.

The process then places (at 1615) the packet in the packet pipeline of the forwarding element. For instance, the process places packet 1405 through the packet pipeline of the forwarding element as shown in FIG. 14. The process then parses (at 1620) the packet and places the identification of the failed port in a predetermined register (or container) of the PHV. For instance, the process generates the PHV 1025 and places the identification of the failed port in a register 1030 of the PHV. The process then forwards (at 1625) the PHV to the MAU.

Next, the process matches (at 1630) the identification of the failed port in the PHV with the match field of the match-action entry that is preprogrammed to match the port's identification. For instance, the process matches the identification of the failed port with the match field 1430 as shown in FIG. 14.

As described above, each match field has a corresponding action. Once the identification of the failed port matches a match field, the process uses (at 1635) the action that is preprogrammed for the corresponding ALU to determine the location of the port's status bit in the port status table. For instance, for the port status table 1205 shown in FIG. 12, the process may calculate an offset to the location of the status bit that corresponds to the failed port.

The process also sets the bit at the determined location to fail. For example, the process sets the status bit 1410 to 0 as shown in FIG. 14. Once the status bit of the failed port is updated in the port status table, the packet is no longer needed and is dropped. The process then ends.

III. Computer System

Figure 17:
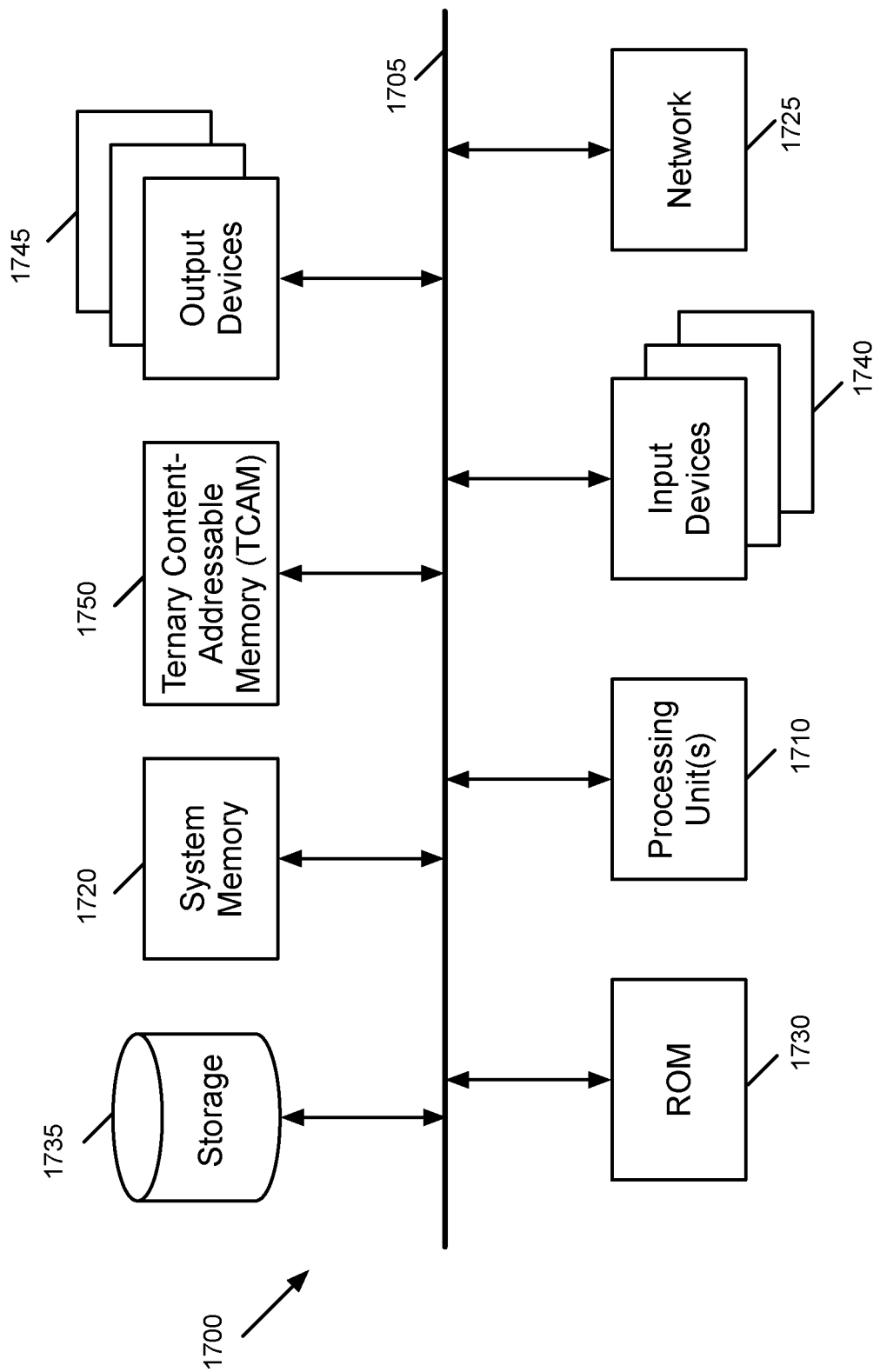
FIG. 17 conceptually illustrates an electronic system with which some embodiments of the invention are implemented.

FIG. 17 conceptually illustrates an electronic system 1700 with which some embodiments of the invention are implemented. The electronic system 1700 can be used to execute any of the control, virtualization, or operating system applications described above. The electronic system 1700 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1700 includes a bus 1705, processing unit(s) 1710, system memory 1720, read-only memory (ROM) 1730, permanent storage device 1735, input devices 1740, output devices 1745, and TCAM 1750.

The bus 1705 collectively represents all system, peripheral, and chipset buses that communicatively connect the numerous internal devices of the electronic system 1700. For instance, the bus 1705 communicatively connects the processing unit(s) 1710 with the read-only memory 1730, the system memory 1720, and the permanent storage device 1735.

From these various memory units, the processing unit(s) 1710 retrieve instructions to execute and data to process in order to execute the processes of the invention. The processing unit(s) may be a single processor or a multi-core processor in different embodiments.

The read-only-memory 1730 stores static data and instructions that are needed by the processing unit(s) 1710 and other modules of the electronic system. The permanent storage device 1735, on the other hand, is a read-and-write memory device. This device is a non-volatile memory unit that stores instructions and data even when the electronic system 1700 is off. Some embodiments of the invention use a mass-storage device (such as a magnetic or optical disk and its corresponding disk drive) as the permanent storage device 1735.

Other embodiments use a removable storage device (such as a floppy disk, flash drive, etc.) as the permanent storage device. Like the permanent storage device 1735, the system memory 1720 is a read-and-write memory device. However, unlike storage device 1735, the system memory is a volatile read-and-write memory, such a random access memory. The system memory stores some of the instructions and data that the processor needs at runtime. In some embodiments, the invention's processes are stored in the system memory 1720, the permanent storage device 1735, and/or the read-only memory 1730. From these various memory units, the processing unit(s) 1710 retrieve instructions to execute and data to process in order to execute the processes of some embodiments.

The bus 1705 also connects to the input and output devices 1740 and 1745. The input devices enable the user to communicate information and select commands to the electronic system. The input devices 1740 include alphanumeric keyboards and pointing devices (also called "cursor control devices"). The output devices 1745 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 17, bus 1705 also couples electronic system 1700 to a network 1725 through a network adapter (not shown). In this manner, the computer can be a part of a network of computers (such as a local area network ("LAN"), a wide area network ("WAN"), or an Intranet, or a network of networks, such as the Internet. Any or all components of electronic system 1700 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. In addition, a number of the figures (including FIGS. 8, 11, 13, and 16) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

In view of the foregoing, one of ordinary skill in the art would understand that the invention is not to be limited by the foregoing illustrative details, but rather is to be defined by the appended claims.

What is claimed is:

1. An integrated circuit for use in association with a network switch in packet forwarding-related operations in a network, the integrated circuit comprising:
   programmable packet data processing pipeline hardware for use in (1) parsing and identifying header field data of received packet data and (2) matching the header field data to programmable match-action table data to determine one or more packet processing-related actions that correspond to the header field data, the one or more packet processing-related actions to be carried out in processing of the packet data, the programmable packet data processing pipeline hardware comprising ingress pipeline hardware and egress pipeline hardware; and
   shared buffer memory to be shared between the ingress pipeline hardware and the egress pipeline hardware for use in (1) storing at least one portion of the received packet data sent from the ingress pipeline hardware and (2) providing the at least one portion of the received packet data stored in the shared buffer memory to the egress pipeline hardware;
   wherein: the ingress pipeline hardware and the egress pipeline hardware are configurable to comprise respective pluralities of pipelines;
   when the integrated circuit is in operation:
   the parsing, the identifying, and the programmable match-action table data are programmable based upon software-generated configuration data to be provided to the integrated circuit;
   in event of failure of at least one path for packet data transmission, the integrated circuit is configurable to select, based upon at least one data structure maintained at a data plane of the integrated circuit, at least one alternative path for the packet data transmission, the at least one path and/or the at least one alternative path being configurable to correspond to multiple respective network hops from the network switch, wherein the at least one alternative path is for use in association with multi-path transmission;
   the at least one data structure is configurable to indicate primary and alternative tunnel-related transmission paths for use in the packet data transmission; the integrated circuit is to implement the one or more packet processing-related actions;
   the one or more packet processing-related actions are configurable to comprise:
   one or more equal-cost multi-path routing operations;
   the integrated circuit is configurable to generate flow-related information and statistics-related information usable in association with software-defined networking;
   the flow-related information is configurable to comprise data flow rate information; and
   the statistics-related information is configurable to comprise packet count information and/or byte count information.

2. The integrated circuit of claim 1, wherein:
   the integrated circuit comprises ternary content addressable memory to store the programmable match-action table data.

3. The integrated circuit of claim 2, wherein:
   the primary and the alternative tunnel-related transmission paths are associated with respective ports and/or respective links that are associated with the integrated circuit.

4. The integrated circuit of claim 3, wherein:
   the integrated circuit comprises an application specific integrated circuit (ASIC) that is for use in association with another integrated circuit.

5. At least one non-transitory machine-readable storage medium storing instructions for being executed by an integrated circuit, the integrated circuit to be used in association with a network switch in packet forwarding-related operations in a network, the integrated circuit comprising programmable packet data processing pipeline hardware and shared buffer memory, the programmable packet data processing pipeline hardware comprising ingress pipeline hardware and egress pipeline hardware, the shared buffer memory to be shared between the ingress pipeline hardware and the egress pipeline hardware, the instructions, when executed by the integrated circuit, resulting in the integrated circuit being configured for performance of operations comprising:
   parsing and identifying, by the programmable packet data processing pipeline hardware, header field data of received packet data;
   matching, by the programmable packet data processing pipeline hardware, the header field data to programmable match-action table data to determine one or more packet processing-related actions that correspond to the header field data, the one or more packet processing-related actions to be carried out in processing of the packet data;
   storing, in the shared buffer memory, at least one portion of the received packet data sent from the ingress pipeline hardware; and
   providing the at least one portion of the received packet data stored in the shared buffer memory to the egress pipeline hardware;
   wherein:
   the ingress pipeline hardware and the egress pipeline hardware are configurable to comprise respective pluralities of pipelines;
   when the integrated circuit is in operation:
   the parsing, the identifying, and the programmable match-action table data are programmable based upon software-generated configuration data to be provided to the integrated circuit;
   in event of failure of at least one path for packet data transmission, the integrated circuit is configurable to select, based upon at least one data structure maintained at a data plane of the integrated circuit, at least one alternative path for the packet data transmission, the at least one path and/or the at least one alternative path being configurable to correspond to multiple respective network hops from the network switch, wherein the at least one alternative path is for use in association with multi-path transmission;
   the at least one data structure is configurable to indicate primary and alternative tunnel-related transmission paths for use in the packet data transmission;
   the integrated circuit is to implement the one or more packet processing-related actions;
   the one or more packet processing-related actions are configurable to comprise:

one or more equal-cost multi-path routing operations;
the integrated circuit is configurable to generate flow-related information and statistics-related information usable in association with software-defined networking;
the flow-related information is configurable to comprise data flow rate information; and
the statistics-related information is configurable to comprise packet count information and/or byte count information.

6. The at least one non-transitory machine-readable storage medium of claim 5, wherein:
the integrated circuit comprises ternary content addressable memory to store the programmable match-action table data.

7. The at least one non-transitory machine-readable storage medium of claim 6, wherein:
the primary and the alternative tunnel-related transmission paths are associated with respective ports and/or respective links that are associated with the integrated circuit.

8. The at least one non-transitory machine-readable storage medium of claim 7, wherein:
the integrated circuit comprises an application specific integrated circuit (ASIC) that is for use in association with another integrated circuit.

9. A method implemented using an integrated circuit, the integrated circuit to be used in association with a network switch in packet forwarding-related operations in a network, the integrated circuit comprising programmable packet data processing pipeline hardware and shared buffer memory, the programmable packet data processing pipeline hardware comprising ingress pipeline hardware and egress pipeline hardware, the shared buffer memory to be shared between the ingress pipeline hardware and the egress pipeline hardware, the method comprising:
parsing and identifying, by the programmable packet data processing pipeline hardware, header field data of received packet data;
matching, by the programmable packet data processing pipeline hardware, the header field data to programmable match-action table data to determine one or more packet processing-related actions that correspond to the header field data, the one or more packet processing-related actions to be carried out in processing of the packet data;
storing, in the shared buffer memory, at least one portion of the received packet data sent from the ingress pipeline hardware; and
providing the at least one portion of the received packet data stored in the shared buffer memory to the egress pipeline hardware;
wherein:
the ingress pipeline hardware and the egress pipeline hardware are configurable to comprise respective pluralities of pipelines;
when the integrated circuit is in operation:
the parsing, the identifying, and the programmable match-action table data are programmable based upon software-generated configuration data to be provided to the integrated circuit;
in event of failure of at least one path for packet data transmission, the integrated circuit is configurable to select, based upon at least one data structure maintained at a data plane of the integrated circuit, at least one alternative path for the packet data transmission, the at least one path and/or the at least one alternative path being configurable to correspond to multiple respective network hops from the network switch, wherein the at least one alternative path is for use in association with multi-path transmission;
the at least one data structure is configurable to indicate primary and alternative tunnel-related transmission paths for use in the packet data transmission;
the integrated circuit is to implement the one or more packet processing-related actions; the one or more packet processing-related actions are configurable to comprise:
one or more equal-cost multi-path routing operations;
the integrated circuit is configurable to generate flow-related information and statistics-related information usable in association with software-defined networking; the flow-related information is configurable to comprise data flow rate information; and the statistics-related information is configurable to comprise packet count information and/or byte count information.

10. The method of claim 9, wherein:
the integrated circuit comprises ternary content addressable memory to store the programmable match-action table data.

11. The method of claim 10, wherein:
the primary and the alternative tunnel-related transmission paths are associated with respective ports and/or respective links that are associated with the integrated circuit.

12. The method of claim 11, wherein:
the integrated circuit comprises an application specific integrated circuit (ASIC) that is for use in association with another integrated circuit.

13. A network switch for use in packet forwarding-related operations in a network, the network switch comprising:
ports to be communicatively coupled to the network; and
an integrated circuit communicatively coupled to the ports, the integrated circuit comprising:
programmable packet data processing pipeline hardware for use in (1) parsing and identifying header field data of received packet data and (2) matching the header field data to programmable match-action table data to determine one or more packet processing-related actions that correspond to the header field data, the one or more packet processing-related actions to be carried out in processing of the packet data, the programmable packet data processing pipeline hardware comprising ingress pipeline hardware and egress pipeline hardware; and
shared buffer memory to be shared between the ingress pipeline hardware and the egress pipeline hardware for use in (1) storing at least one portion of the received packet data sent from the ingress pipeline hardware and (2) providing the at least one portion of the received packet data stored in the shared buffer memory to the egress pipeline hardware;
wherein:
the ingress pipeline hardware and the egress pipeline hardware are configurable to comprise respective pluralities of pipelines;
when the network switch is in operation:
the parsing, the identifying, and the programmable match-action table data are programmable based upon software-generated configuration data to be provided to the integrated circuit;
in event of failure of at least one path for packet data transmission, the integrated circuit is configurable to select, based upon at least one data structure maintained at a data plane of the integrated circuit, at least one alternative path for the packet data transmission, the at least one path and/or the at least one alternative path being configurable to correspond to multiple respective network hops from the network switch, wherein the at least one alternative path is for use in association with multi-path transmission;

the at least one data structure is configurable to indicate primary and alternative tunnel-related transmission paths for use in the packet data transmission;

the integrated circuit is to implement the one or more packet processing-related actions;

the one or more packet processing-related actions are configurable to comprise:

one or more equal-cost multi-path routing operations;

the integrated circuit is configurable to generate flow-related information and statistics-related information usable in association with software-defined networking;

the flow-related information is configurable to comprise data flow rate information; and the statistics-related information is configurable to comprise packet count information and/or byte count information.

14. The network switch of claim 13, wherein:
the network switch comprises ternary content addressable memory to store the programmable match-action table data.

15. The network switch of claim 14, wherein:
the primary and the alternative tunnel-related transmission paths are associated with respective of the ports of the network switch and/or respective links that are associated with the respective of the ports.

16. The network switch of claim 15, wherein:
the integrated circuit comprises an application specific integrated circuit (ASIC) that is for use in association with another integrated circuit.

17. An integrated circuit for use in association with a network forwarding element in packet forwarding-related operations in a network, the integrated circuit comprising:
programmable packet processor device for use in
(1) parsing and identifying header field data of received packet data and
(2) matching the header field data to programmable match-action table data to determine one or more packet processing-related actions that correspond to the header field data, the one or more packet processing-related actions to be carried out in processing of the packet data, the programmable packet processor device comprising ingress and egress pipelines; and
shared storage to be shared between the ingress pipeline and the egress pipeline for use in
(1) storing at least one portion of the received packet data sent from the ingress pipeline and
(2) providing the at least one portion of the received packet data stored in the shared storage to the egress pipeline;
wherein:
the ingress pipeline and the egress pipeline are configurable to comprise respective pluralities of pipelines;
when the integrated circuit is in operation:
the parsing, the identifying, and the programmable match-action table data are programmable based upon software-generated configuration data to be provided to the integrated circuit;
in event of failure of at least one path for packet data transmission, the integrated circuit is configurable to select, based upon at least one data structure maintained at a data plane of the integrated circuit, at least one alternative path for the packet data transmissions the at least one path and/or the at least one alternative path being configurable to correspond to multiple respective network hops from the network switch, wherein the at least one alternative path is for use in association with multi-path transmission;

the at least one data structure is configurable to indicate primary and alternative tunnel- related transmission paths for use in the packet data transmission;

the integrated circuit is to implement the one or more packet processing-related actions;

the one or more packet processing-related actions are configurable to comprise:

one or more equal-cost multi-path routing operations;

the integrated circuit is configurable to generate flow-related information and statistics- related information usable in association with software-defined networking;

the flow-related information is configurable to comprise data flow rate information; and the statistics-related information is configurable to comprise packet count information and/or byte count information.

18. The integrated circuit of claim 17, wherein:
the integrated circuit comprises ternary content addressable storage to store the programmable match-action table data.

19. The integrated circuit of claim 18, wherein:
the primary and the alternative tunnel-related transmission paths are associated with respective ports and/or respective links that are associated with the integrated circuit.

20. The integrated circuit of claim 19, wherein:
the integrated circuit comprises an application specific integrated circuit (ASIC) that is for use in association with another integrated circuit.

21. An integrated circuit for use in association with a network switch in packet forwarding-related operations in a network, the integrated circuit comprising:
programmable packet data processing pipeline hardware configurable to comprise ingress pipeline hardware and egress pipeline hardware, the programmable packet data processing pipeline hardware to be used in:
(1) parsing and identifying header field data of received packet data;
(2) matching the header field data to programmable match-action table data to determine one or more packet processing-related actions that correspond to the header field data, the one or more packet processing-related actions being configurable to comprise modifying, at least in part, the header field data to generate modified header data; and
(3) generating, at a deparser stage of the programmable packet data processing pipeline hardware, based upon the header field data and the modified header data, output packet data to be output from the integrated circuit; and
shared buffer memory to be shared between the ingress pipeline hardware and the egress pipeline hardware for use in (1) storing at least one portion of the received packet data sent from the ingress pipeline hardware and (2) providing the at least one portion of the received packet data stored in the shared buffer memory to the egress pipeline hardware;

wherein:
when the integrated circuit is in operation:
the parsing, the identifying, the programmable match-action table data, and the generating are programmable based upon compiler-generated configuration data to be provided to the integrated circuit;
in event of failure of at least one path for packet data transmission, the integrated circuit is configurable to select, based upon at least one data structure maintained at a data plane of the integrated circuit, at least one alternative path for the packet data transmissions the at least one path and/or the at least one alternative path being configurable to correspond to multiple respective network hops from the network switch, wherein the at least one alternative path is for use in association with multi-path transmission;
the at least one data structure is configurable to indicate primary and alternative transmission paths for use in the packet data transmission;
the integrated circuit is to maintain port status information associated with the integrated circuit for use in association with the at least one data structure;
the at least one alternative path is configurable to be associated with link aggregation;
the one or more packet processing-related actions are configurable to comprise:
one or more equal-cost multi-path routing operations;
the integrated circuit is configurable to generate statistics-related information; and
the statistics-related information is configurable to comprise packet count information and/or byte count information.

22. The integrated circuit of claim 21, wherein:
the integrated circuit comprises ternary content addressable memory to store, at least in part, the programmable match-action table data.

23. The integrated circuit of claim 22, wherein:
the primary and the alternative transmission paths are associated with respective ports that are associated with the integrated circuit.

24. The integrated circuit of claim 23, wherein:
the integrated circuit comprises an application specific integrated circuit (ASIC) that is comprised in the network switch.

25. At least one non-transitory machine-readable storage medium storing instructions for being executed by an integrated circuit, the integrated circuit to be used in association with a network switch in packet forwarding-related operations in a network, the integrated circuit comprising programmable packet data processing pipeline hardware and shared buffer memory, the programmable packet data processing pipeline hardware being configurable to comprise ingress pipeline hardware and egress pipeline hardware, the shared buffer memory to be shared between the ingress pipeline hardware and the egress pipeline hardware, the instructions, when executed by the integrated circuit, resulting in the integrated circuit being configured for performance of operations comprising:
parsing and identifying, by the programmable packet data processing pipeline hardware, header field data of received packet data;
matching, the programmable packet data processing pipeline hardware, the header field data to programmable match-action table data to determine one or more packet processing-related actions that correspond to the header field data, the one or more packet processing-related actions being configurable to comprise modifying, at least in part, the header field data to generate modified header data;
generating, at a deparser stage of the programmable packet data processing pipeline hardware, based upon the header field data and the modified header data, output packet data to be output from the integrated circuit; storing, in the shared buffer memory, at least one portion of the received packet data sent from the ingress pipeline hardware; and providing the at least one portion of the received packet data stored in the shared buffer memory to the egress pipeline hardware;
wherein:
when the integrated circuit is in operation:
the parsing, the identifying, the programmable match-action table data, and the generating are programmable based upon compiler-generated configuration data to be provided to the integrated circuit;
in event of failure of at least one path for packet data transmission, the integrated circuit is configurable to select, based upon at least one data structure maintained at a data plane of the integrated circuit, at least one alternative path for the packet data transmissions the at least one path and/or the at least one alternative path being configurable to correspond to multiple respective network hops from the network switch, wherein the at least one alternative path is for use in association with multi-path transmission;
the at least one data structure is configurable to indicate primary and alternative transmission paths for use in the packet data transmission;
the integrated circuit is to maintain port status information associated with the integrated circuit for use in association with the at least one data structure;
the at least one alternative path is configurable to be associated with link aggregation;
the one or more packet processing-related actions are configurable to comprise:
one or more equal-cost multi-path routing operations;
the integrated circuit is configurable to generate statistics-related information; and
the statistics-related information is configurable to comprise packet count information and/or byte count information.

26. The at least one non-transitory machine-readable storage medium of claim 25, wherein:
the integrated circuit comprises ternary content addressable memory to store, at least in part, the programmable match-action table data.

27. The at least one non-transitory machine-readable storage medium of claim 26, wherein:
the primary and the alternative transmission paths are associated with respective ports that are associated with the integrated circuit.

28. The at least one non-transitory machine-readable storage medium of claim 27, wherein:
the integrated circuit comprises an application specific integrated circuit (ASIC) that is comprised in the network switch.

29. A method implemented using an integrated circuit, the integrated circuit to be used in association with a network switch in packet forwarding-related operations in a network, the integrated circuit comprising programmable packet data processing pipeline hardware and shared buffer memory, the programmable packet data processing pipeline hardware being configurable to comprise ingress pipeline hardware and egress pipeline hardware, the shared buffer memory to be shared between the ingress pipeline hardware and the egress pipeline hardware, the method comprising:

parsing and identifying, by the programmable packet data processing pipeline hardware, header field data of received packet data;

matching, the programmable packet data processing pipeline hardware, the header field data to programmable match-action table data to determine one or more packet processing-related actions that correspond to the header field data, the one or more packet processing-related actions being configurable to comprise modifying, at least in part, the header field data to generate modified header data;

generating, at a deparser stage of the programmable packet data processing pipeline hardware, based upon the header field data and the modified header data, output packet data to be output from the integrated circuit;

storing, in the shared buffer memory, at least one portion of the received packet data sent from the ingress pipeline hardware; and providing the at least one portion of the received packet data stored in the shared buffer memory to the egress pipeline hardware;

wherein:

when the integrated circuit is in operation:

the parsing, the identifying, the programmable match-action table data, and the generating are programmable based upon compiler-generated configuration data to be provided to the integrated circuit;

in event of failure of at least one path for packet data transmission, the integrated circuit is configurable to select, based upon at least one data structure maintained at a data plane of the integrated circuit, at least one alternative path for the packet data transmission, the at least one path and/or the at least one alternative path being configurable to correspond to multiple respective network hops from the network switch, wherein the at least one alternative path is for use in association with multi-path transmission;

the at least one data structure is configurable to indicate primary and alternative transmission paths for use in the packet data transmission;

the integrated circuit is to maintain port status information associated with the integrated circuit for use in association with the at least one data structure;

the at least one alternative path is configurable to be associated with link aggregation;

the one or more packet processing-related actions are configurable to comprise:

one or more equal-cost multi-path routing operations;

the integrated circuit is configurable to generate statistics-related information; and the statistics-related information is configurable to comprise packet count information and/or byte count information.

30. The method of claim 29, wherein:

the integrated circuit comprises ternary content addressable memory to store, at least in part, the programmable match-action table data.

31. The method of claim 30, wherein:

the primary and the alternative transmission paths are associated with respective ports that are associated with the integrated circuit.

32. The method of claim 31, wherein:

the integrated circuit comprises an application specific integrated circuit (ASIC) that is comprised in the network switch.

33. A network switch for use in packet forwarding-related operations in a network, the network switch comprising:

ports to be communicatively coupled to the network; and an integrated circuit communicatively coupled to the ports, the integrated circuit comprising:

programmable packet data processing pipeline hardware configurable to comprise ingress pipeline hardware and egress pipeline hardware, the programmable packet data processing pipeline hardware to be used in:

(1) parsing and identifying header field data of received packet data;

(2) matching the header field data to programmable match-action table data to determine one or more packet processing-related actions that correspond to the header field data, the one or more packet processing-related actions being configurable to comprise modifying, at least in part, the header field data to generate modified header data; and (3) generating, at a deparser stage of the programmable packet data processing pipeline hardware, based upon the header field data and the modified header data, output packet data to be output from the integrated circuit; and shared buffer memory to be shared between the ingress pipeline hardware and the egress pipeline hardware for use in (1) storing at least one portion of the received packet data sent from the ingress pipeline hardware and (2) providing the at least one portion of the received packet data stored in the shared buffer memory to the egress pipeline hardware;

wherein:

when the integrated circuit is in operation:

the parsing, the identifying, the programmable match-action table data, and the generating are programmable based upon compiler-generated configuration data to be provided to the integrated circuit;

in event of failure of at least one path for packet data transmission, the integrated circuit is configurable to select, based upon at least one data structure maintained at a data plane of the integrated circuit, at least one alternative path for the packet data transmissions the at least one path and/or the at least one alternative path being configurable to correspond to multiple respective network hops from the network switch, wherein the at least one alternative path is for use in association with multi-path transmission;

the at least one data structure is configurable to indicate primary and alternative transmission paths for use in the packet data transmission;

the integrated circuit is to maintain port status information associated with the integrated circuit for use in association with the at least one data structure;

the at least one alternative path is configurable to be associated with link aggregation;

the one or more packet processing-related actions are configurable to comprise:

one or more equal-cost multi-path routing operations;

the integrated circuit is configurable to generate statistics-related information; and the statistics-related information is configurable to comprise packet count information and/or byte count information.

34. The network switch of claim 33, wherein:
the integrated circuit comprises ternary content addressable memory to store, at least in part, the programmable match-action table data.
35. The network switch of claim 34, wherein:
the primary and the alternative transmission paths are associated with respective ports that are associated with the integrated circuit.
36. The network switch of claim 35, wherein:
the integrated circuit comprises an application specific integrated circuit (ASIC) that is comprised in the network switch.

* * * * *